United States Patent
Takaoka et al.

(10) Patent No.: US 9,020,023 B2
(45) Date of Patent: Apr. 28, 2015

(54) RECEPTION DEVICE AND RECEPTION METHOD

(75) Inventors: Katsumi Takaoka, Chiba (JP); Naoki Yoshimochi, Kanagawa (JP); Hidetoshi Kawauchi, Kanagawa (JP); Ryo Hasegawa, Tokyo (JP); Hirofumi Maruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/110,719

(22) PCT Filed: May 15, 2012

(86) PCT No.: PCT/JP2012/062412
§ 371 (c)(1),
(2), (4) Date: Oct. 9, 2013

(87) PCT Pub. No.: WO2012/161031
PCT Pub. Date: Nov. 29, 2012

(65) Prior Publication Data
US 2014/0029661 A1    Jan. 30, 2014

(30) Foreign Application Priority Data

May 23, 2011    (JP) .................................. 2011-114905

(51) Int. Cl.
*H03H 7/30* (2006.01)
*H03H 7/40* (2006.01)
(Continued)

(52) U.S. Cl.
CPC .... *H04L 25/03057* (2013.01); *H04L 25/03159* (2013.01); *H04L 2025/03726* (2013.01)

(58) Field of Classification Search
USPC ......... 375/229, 231, 232, 235, 350, 284, 285, 375/346; 455/296, 307, 306, 63.1; 708/322, 708/323
See application file for complete search history.

(56) References Cited

U.S. PATENT DOCUMENTS

| 5,214,671 A | 5/1993 | Nakai |
| 5,787,118 A | 7/1998 | Ueda |

(Continued)

FOREIGN PATENT DOCUMENTS

| JP | 03-244220 | 10/1991 |
| JP | 04-259111 | 9/1992 |

(Continued)

OTHER PUBLICATIONS

Ming Liu, et al., "A Combined Time and Frequency Algorithm for Improved Channel Estimation in TDS-OFDM," IEEE International Conference on Communications (ICC), May 27, 2010.

(Continued)

*Primary Examiner* — Phuong Phu
(74) *Attorney, Agent, or Firm* — Rader, Fishman & Grauer PLLC

(57) ABSTRACT

The present technique relates to a reception device and a reception method which can improve equalization performance. An equalization processing unit has a time domain equalization unit which equalizes a received signal in a time domain and a frequency domain equalization unit which is provided in parallel to the time domain equalization unit and which equalizes the received signal in a frequency domain, and performs control of switching between the time domain equalization unit and the frequency domain equalization unit. The present technique can be applied to, for example, equalize a signal of data transmitted by way of single carrier transmission or data transmitted by way of multicarrier transmission.

12 Claims, 20 Drawing Sheets

(51) Int. Cl.
  *H03K 5/159* (2006.01)
  *H04L 25/03* (2006.01)

(56) References Cited

U.S. PATENT DOCUMENTS

| | | | |
|---|---|---|---|
| 6,044,485 A | 3/2000 | Dent et al. | |
| 7,869,495 B2* | 1/2011 | Cho et al. | 375/229 |
| 2008/0175310 A1* | 7/2008 | Okamura et al. | 375/232 |
| 2009/0135935 A1* | 5/2009 | Yang et al. | 375/265 |
| 2009/0244399 A1 | 10/2009 | Cohen et al. | |

FOREIGN PATENT DOCUMENTS

| | | |
|---|---|---|
| JP | 07-086995 | 3/1995 |
| JP | 10-163934 | 6/1998 |
| WO | WO-98/29979 | 7/1998 |

OTHER PUBLICATIONS

Ming Liu, et al., "Analysis and Performance Comparison of DVB-T and DTMB Systems for Terrestrial Digital TV," IEEE Singapore International Conference on Communication Systems (ICCS), Nov. 21, 2008.

Zheng, Ai-Wei, et al, "Novel Synchronization for TDS-OFDM-Based Digital Television Terrestrial Broadcast Systems" IEEE Transactions on Broadcasting, vol. 50 No. 2, Jun. 2004.

He, Dazhi, et al, "Error Rotated Decision Feedback Equalizer for Chinese DTTB Receiver" National Natural Science Foundation of China (60332030, 60625103) and Science and Technology Commission of Shanghai Municipality (05DZ22102).

Okuyama, Suguru et al., Frequency-Domain Iterative Successive MUI Cancellation and Antenna Diversity for SC-FDMA using Frequency-Domain Filtering, IEICE Technical Report, vol. 109, No. 440, The Institute of Electronics, Information and Communication Engineers, Feb. 24, 2010, p. 449-454.

International Search Report; Application No. PCT/2012/062412; Filed: May 15, 2012. Completion of International Search Report: Jun. 4, 2012. (Form PCT/ISA/210).

Written Opinion of the International Searching Authority; Application No. PCT/2012/062412; Filed: May 15, 2012. Report Dated: Jun. 12, 2012. (Forms PCT/ISA/220 and PCT/ISA/237).

* cited by examiner

FIG. 6

| PN | Frame Header LENGTH | Frame Body LENGTH | FRAME LENGTH |
|---|---|---|---|
| PN420 | 420 | 3780 | 4200 |
| PN595 | 595 | 3780 | 4375 |
| PN945 | 945 | 3780 | 4725 |

RECEPTION DEVICE AND RECEPTION METHOD

TECHNICAL FIELD

The present technique relates to a reception device and a reception method, and, more particularly, relates to a reception device and a reception method which can improve equalization performance.

BACKGROUND ART

Digital terrestrial broadcasting standards include a DTMB (Digital Terrestrial Multimedia Broadcast) standard. According to the DTMB standard, it is possible to select one of a modulation method using a single carrier and a modulation method using a multicarrier as a data modulation method.

Hereinafter, transmitting data according to the modulation method using a single carrier is referred to as "single carrier transmission", and transmitting data according to the modulation method using a multicarrier is referred to as "multicarrier transmission".

Upon single carrier transmission, data transmission according to the DTMB standard is performed by cyclically transmitting a PN signal and a data signal. Further, upon multicarrier transmission, data transmission is performed by cyclically transmitting data obtained by applying an IFFT (Inverse Fast Fourier Transform) operation to a PN signal and a data signal. A PN signal is a known signal formed with a predetermined data sequence, and is inserted as a guard interval for preventing an interference between data signals.

A reception device which supports the DTMB standard has an equalizer which receives data transmitted by way of single carrier transmission, and an equalizer which receives data transmitted by way of multicarrier transmission.

[Configuration of Single Carrier Equalizer]

FIG. 1 is a view illustrating a configuration of a single carrier equalizer which receives data transmitted by way of single carrier transmission.

A circuit of a previous stage of a single carrier equalizer performs frequency conversion on a received signal and performs processing such as A/D conversion and orthogonal demodulation on an obtained IF signal. An input signal ID(t) obtained by performing each processing is input to a FFE 21. The single carrier equalizer equalizes a time domain signal using the FFE (Feed Forward Equalizer) 21 and a FBE (Feed Back Equalizer) 23.

The FFE 21 has a variable coefficient filter and a coefficient update unit, and performs a convolution operation on the input signal ID(t) and a coefficient using the coefficient obtained by the coefficient update unit. The FFE 21 outputs a signal OD0(t) which indicates a result of the convolution operation, to an adder 22.

The adder 22 generates an equalized signal OD(t)(OD(t)=OD0(t)+OD1(t)) by adding an output signal OD0(t) of the FFE 21 and an output signal OD1(t) of the FBE 23, and outputs the equalized signal. The equalized signal OD(t) output from the adder 22 is output to an outside of the single carrier equalizer, and is supplied to a hard decision unit 24 and a subtractor 25.

The hard decision unit 24 performs hard decision on the equalized signal OD(t) supplied from the adder 22, and outputs a signal OD'(t) which indicates a hard decision result. The signal OD'(t) is supplied to the FBE 23 and a subtractor 25.

The FBE 23 has a variable coefficient filter and a coefficient update unit, and performs a convolution operation on a signal OD'(t) supplied from the hard decision unit 24 and a coefficient using the coefficient obtained by the coefficient update unit. The FBE 23 outputs a signal OD1(t) which indicates a result of the convolution operation. The output signal OD1(t) is supplied to the adder 22, and is used to add to the output signal OD0(t).

The subtractor 25 subtracts the signal OD'(t) which indicates a hard decision result supplied from the hard decision unit 24, from the equalized signal OD(t) supplied from the adder 22, and outputs an error signal ED(t)(ED(t)=OD(t)−OD'(t)). The error signal ED(t) output from the subtractor 25 is supplied to the FFE 21 and the FBE 23.

The coefficient update unit of the FFE 21 performs a LMS operation based on the input signal ID(t) and an error signal ED(t) supplied from the subtractor 25, and updates a coefficient of the FFE 21.

The coefficient update unit of the FBE 23 performs a LMS operation based on the signal OD'(t) which indicates the hard decision result supplied from the hard decision unit 24 and the error signal ED(t) supplied from the subtractor 25, and updates a coefficient of the FBE 23.

Thus, the single carrier equalizer performs a hard decision operation which is an operation of equalizing the input signal ID(t), an operation of an error signal, and an operation of updating coefficients of the variable coefficient filters (the FFE 21 and the FBE 23) using a time domain signal. "(t)" represents that a signal is a time domain signal.

[Configuration of Multicarrier Equalizer]

FIG. 2 is a view illustrating a configuration of a multicarrier equalizer which receives data transmitted by way of multicarrier transmission. The input signal ID(t) is input to the subtractor 11.

The subtractor 11 cancels a PN signal by subtracting from the input signal ID(t) an estimation value PN'(t) of the PN signal supplied from the channel estimation unit 15, and outputs a data signal (ID(t)-PN'(t)) to the FFT operating unit 12.

The FFT operating unit 12 performs an FFT operation on the data signal supplied from the subtractor 11, and outputs a data signal D(f) to a distortion compensation unit 13. A data signal transmitted by way of multicarrier transmission is subjected to the IFFT operation by an apparatus on the transmission side, and the multicarrier equalizer performs the FFT operation on the data signal. The data signal D(f) is a frequency domain signal.

The PN playback unit 14 plays back a PN signal PN(t), and outputs the PN signal PN(t) to the channel estimation unit 15.

The channel estimation unit 15 has a variable coefficient filter and a coefficient update unit, and performs a convolution operation on the PN signal PN(t) played back by the PN playback unit 14 and a coefficient using the coefficient obtained by the coefficient update unit. The channel estimation unit 15 outputs an estimation value PN'(t) of the PN signal calculated by the convolution operation, to the subtractor 11.

The coefficient update unit of the channel estimation unit 15 performs a LMS operation based on the PN signal PN(t) supplied from the PN playback unit 14 and the error signal EP(t) supplied from the subtractor 11, and updates a coefficient of the channel estimation unit 15.

The control unit 16 supplies the coefficient obtained by the coefficient update unit of the channel estimation unit 15, that is, an estimated impulse response h(t), to the FFT operating unit 17.

The FFT operating unit 17 performs an FFT operation on an impulse response signal supplied from the control unit 16, and outputs the impulse response H(f) to the distortion compensation unit 13.

The distortion compensation unit 13 generates the equalized signal OD(f) by compensating for distortion of the data signal D(f) supplied from the FFT operating unit 12 using the impulse response H(f) supplied from the FFT operating unit 17, and outputs the equalized signal OD(f).

The equalized signal OD(f) output from the distortion compensation unit 13 is output to an outside.

Thus, the multicarrier equalizer performs an operation of distortion compensation which is an operation of equalizing the input signal ID(t) using the data from which a PN is canceled and a frequency domain signal obtained by converting the coefficient of the channel estimation unit 15 into the frequency. "(f)" represents that a signal is a frequency domain signal.

Meanwhile, for example, Non-Patent Document 1 discloses single carrier equalization and, for example, Non-Patent Documents 2 and 3 disclose multicarrier equalization.

CITATION LIST

Non-Patent Documents

Non-Patent Document 1: Dazhi He, Weiqiang Liang, Wenjun Zhang, Ge Huang, Yunfeng Guan, Feng Ju, "Error rotated decision feedback equalizer for Chinese DTTB Receiver", Broadband Multimedia Systems and Broadcasting, 2008 IEEE International Symposium on Non-Patent Document 2: Liu, M., Crussiere, M., Helard, J.-F., "A Combined Time and Frequency Algorithm for Improved Channel Estimation in TDS-OFDM", Communications (ICC), 2010 IEEE International Conference on Non-Patent Document 3: Zi-Wei Zheng, Zhi-Xing Yang, Chang-Yong Pan, and Yi-Sheng Zhu, Senior Member, IEEE, "Novel Synchronization for TDS-OFDM-Based Digital Television Terrestrial Broadcast Systems", IEEE TRANSACTIONS ON BROADCASTING, VOL. 50, NO. 2, JUNE 2004

SUMMARY OF THE INVENTION

Problems to be Solved by the Invention

A reception device which supports a DTMB standard has a circuit which performs equalization using a time domain (time region) signal to receive data transmitted by way of single carrier transmission, and a circuit which performs equalization using a frequency domain (frequency region) signal to receive data transmitted by way of multicarrier transmission.

Although equalization in a time domain is effective in multipath environment of a significant delay amount, equalization in a frequency domain is effective for a channel which includes a pre echo of a significant delay amount in environment such as a SFN (Single Frequency Network).

Thus, there are situations in which each of time domain equalization and frequency domain equalization is suitable or is not suitable depending on channels, and therefore it is difficult to achieve optimal equalization performance in all broadcasting and channel environments.

The present technique solves the above problem, and can improve equalization performance in various broadcasting and channel environments.

Solutions to Problems

A reception device according to one aspect of the present technique is a reception device which has: a time domain equalization unit which equalizes a received signal in a time domain; a frequency domain equalization unit which is provided in parallel to the time domain equalization unit and which equalizes the received signal in a frequency domain; and an equalization method control unit which performs control of switching between the time domain equalization unit and the frequency domain equalization unit.

A reception method according to one aspect of the present technique is a reception method which includes a step of performing control of switching between a time domain equalization unit which equalizes a received signal in a time domain, and a frequency domain equalization unit which is provided in parallel to the time domain equalization unit and which equalizes the received signal in a frequency domain.

According to one aspect of the above present technique, control of switching between a time domain equalization unit which equalizes a received signal in a time domain, and a frequency domain equalization unit which is provided in parallel to the time domain equalization unit and which equalizes the received signal in a frequency domain is performed.

In addition, the reception device may be an independent device or an internal block which forms one device.

Effects of the Invention

According to the present technique, it is possible to improve equalization performance in various broadcasting and channel environments.

BRIEF DESCRIPTION OF DRAWINGS

FIG. 6 is a view illustrating a PN length.

MODE FOR CARRYING OUT THE INVENTION

Hereinafter, a mode for carrying out the present technique will be described.

[Configuration Example of Reception Device]

Figure 3:
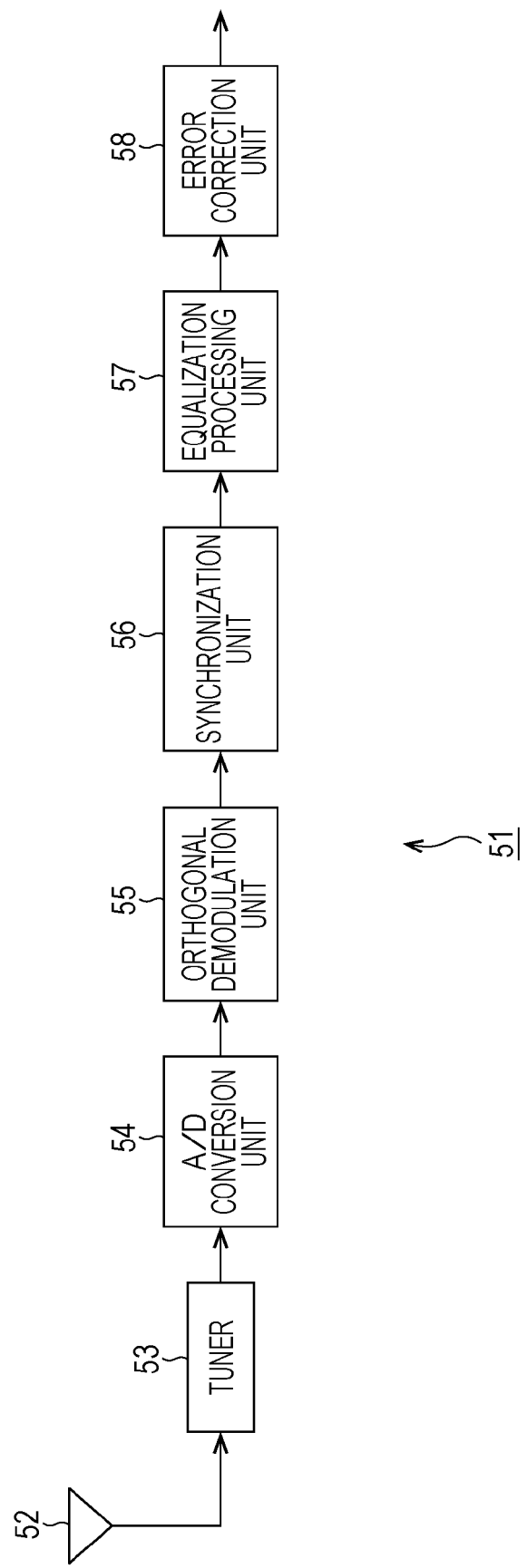
FIG. 3 is a view illustrating a configuration example of a reception device according to one embodiment of the present invention.

FIG. 3 is a view illustrating a configuration example of a reception device according to one embodiment of the present invention.

A reception device 51 has an antenna 52, a tuner 53, an A/D conversion unit 54, an orthogonal demodulation unit 55, a synchronization unit 56, an equalization processing unit 57, and an error correction unit 58. The reception device 51 is, for example, a reception device which supports a DTMB standard which is a digital terrestrial broadcasting standard.

As described above, according to the DTMB standard, it is possible to select one of a modulation method using a single carrier and a modulation method using a multicarrier as a data modulation method. The reception device 51 which is the reception device which supports the DTMB standard has a function of receiving data transmitted according to the modulation method using a single carrier, and a function of receiving data transmitted according to the modulation method using a multicarrier.

The tuner 53 receives an RF signal, and outputs an IF signal obtained by performing frequency conversion, to the A/D conversion unit 54.

The A/D conversion unit 54 performs A/D conversion on the signal supplied from the tuner 53, and outputs the obtained data.

The orthogonal demodulation unit 55 performs orthogonal demodulation on data supplied from the A/D conversion unit 54, and outputs a baseband signal of a complex signal (referred to as an "IQ signal" below) represented by a complex number including the resulting real axis component (I (In Phase) component) and imaginary component (Q (Quadrature Phase) component). The orthogonal demodulation unit 55 outputs a time domain signal which represents data transmitted by way of single carrier transmission or a time domain signal which represents data transmitted by way of multicarrier transmission.

The synchronization unit 56 supplies the IQ signal from the orthogonal demodulation unit 55 to the equalization processing unit 57, and performs synchronization processing of establishing synchronization using, for example, a correlation between PN sequences which are frame headers included in this IQ signal.

The equalization processing unit 57 equalizes the signal supplied from the synchronization unit 56. The equalization processing unit 57 equalizes both signals of a signal which represents data transmitted by way of single carrier transmission and a signal which represents data transmitted by way of multicarrier transmission. The equalization processing unit 57 outputs the equalized signal.

The error correction unit 58 performs error correction processing on the equalized signal supplied from the equalization processing unit 57.

Figure 4:
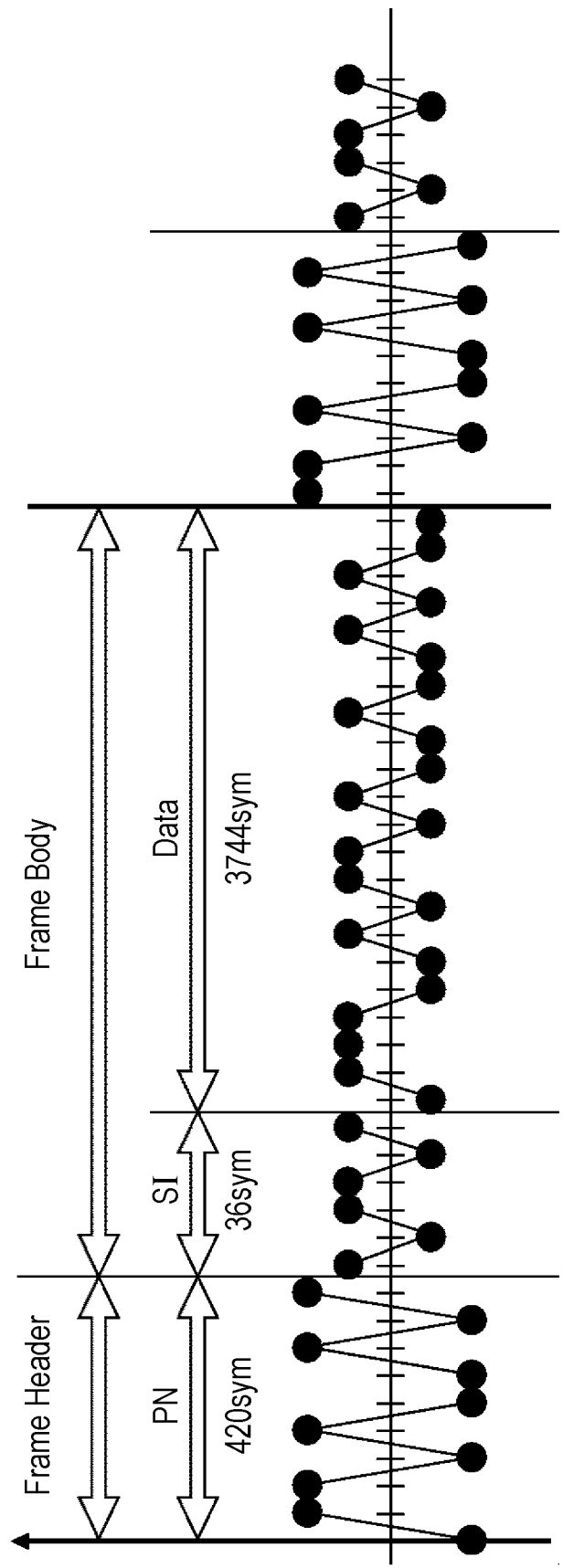
FIG. 4 is a view illustrating a configuration example of a frame of a single carrier signal as a baseband signal.

FIG. 4 is a view illustrating a configuration example of a frame of a single carrier signal as a baseband signal.

The frame of a single carrier signal as a baseband is formed with a frame header of 420 symbols (sym) of a PN sequence and a frame body of 3744+36 symbols. Further, the frame body includes 36 symbols of system information (SI) and 3744 symbols of actual data.

Figure 5:
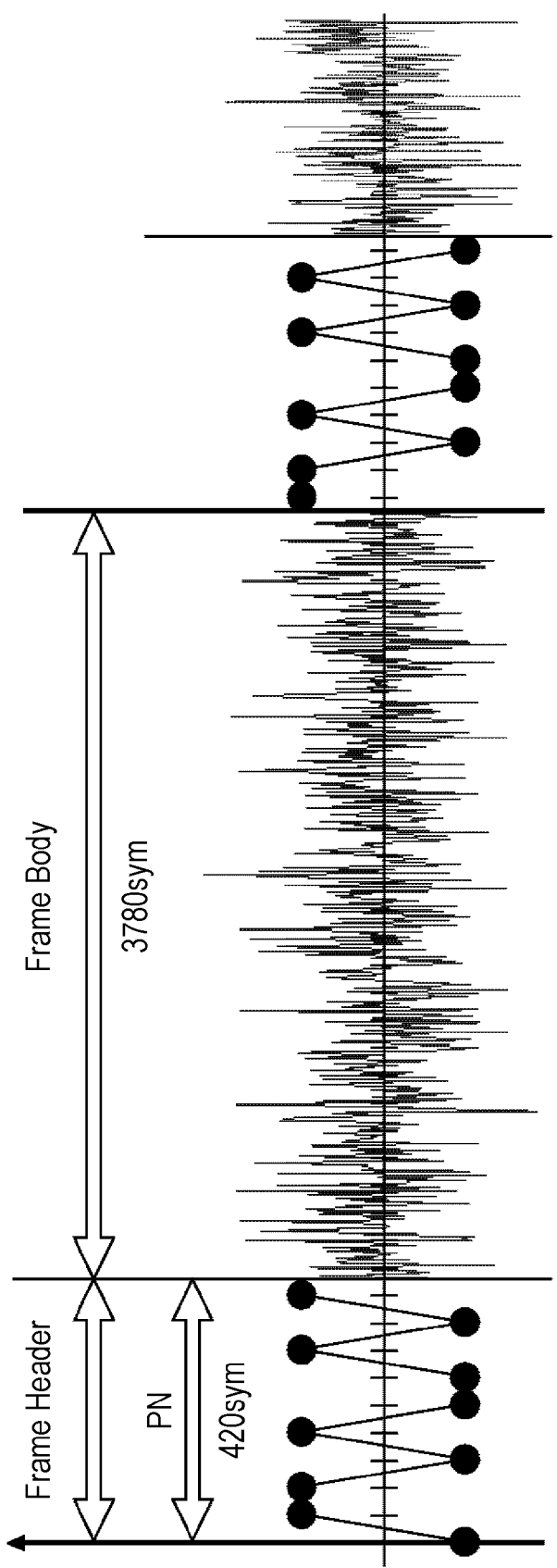
FIG. 5 is a view illustrating a configuration example of a frame of a multicarrier signal as a baseband signal.

FIG. 5 is a view illustrating a configuration example of a frame of a multicarrier signal as a baseband signal.

The frame of a multicarrier signal as a baseband is formed with a frame header of 420 symbols (sym) of a PN sequence and a frame body which is an OFDM signal of 3780 symbols of actual data and system information.

Next, the equalization processing unit 57 which uses time domain equalization and frequency domain equalization will be described.

FIG. 6 is a view illustrating a PN length.

According to the DTMB standard, three types of different PN lengths including the Frame Header of 420 symbols illustrated in FIGS. 4 and 5 are defined. A PN 420 has a PN sequence a frame header length of which is 420 symbols, a PN 595 has a PN sequence a frame header length of which is 595 symbols and a PN 945 has a PN sequence a frame header length of which is 945 symbols.

The frame body length is always the same and includes 3780 symbols, and, therefore, the frame length of the PN 420 is 4200 symbols, the frame length of the PN 595 is 4375 symbols, and the frame length of the PN 945 is 4725 symbols.

[Configuration Example of Equalization Processing Unit 57]

Figure 7:
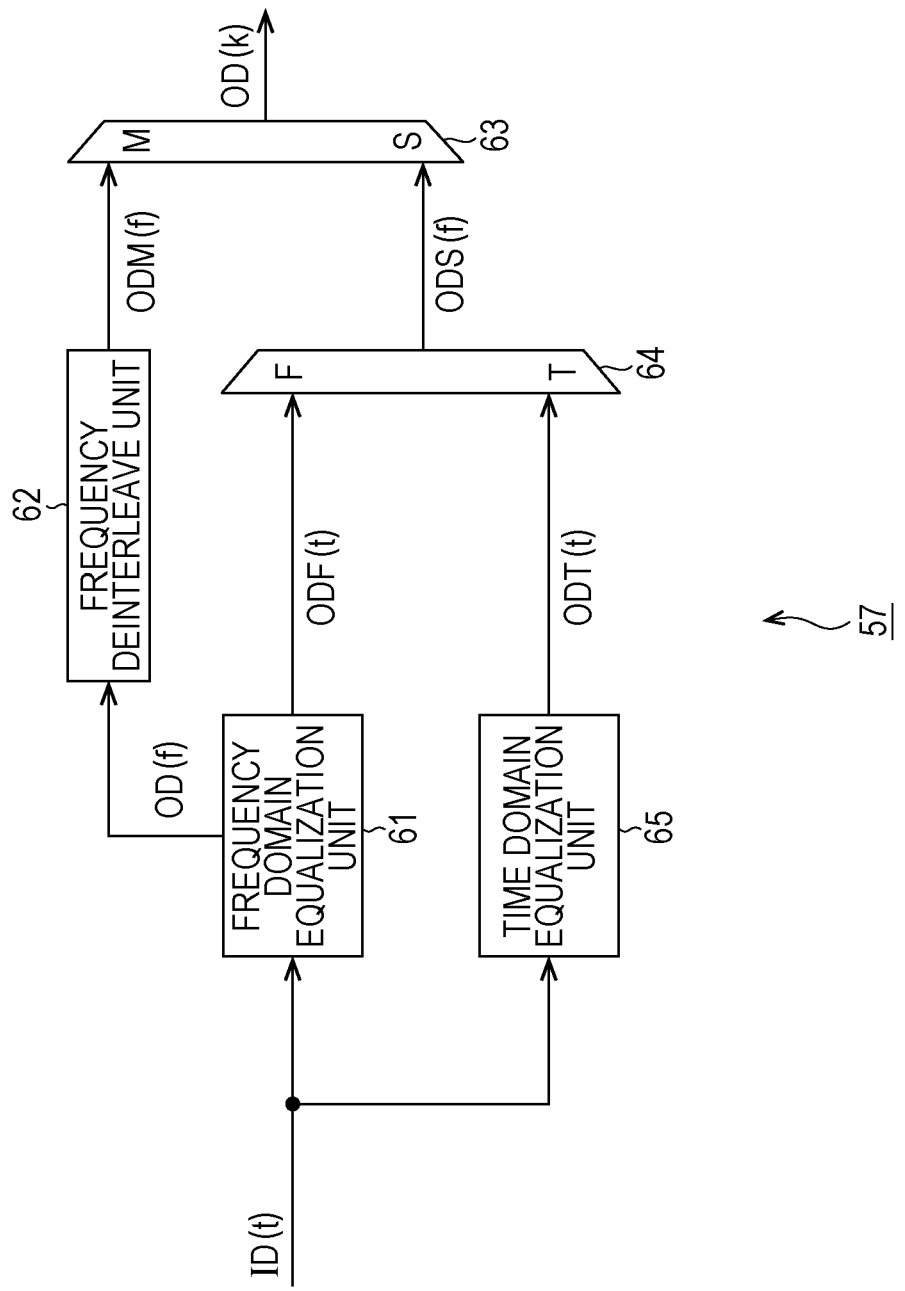
FIG. 7 is a view illustrating a configuration example of an equalization processing unit.

FIG. 7 is a view illustrating a configuration of the equalization processing unit 57.

Although a detailed configuration will be described below, the equalization processing unit 57 mainly has a frequency domain equalization unit 61, a time domain equalization unit 65, a frequency deinterleave unit 62, a selector 63 and a selector 64 as illustrated in FIG. 7. The time domain signal output from the synchronization unit 56 is input to the frequency domain equalization unit 61 and the time domain equalization unit 65.

Figure 1:
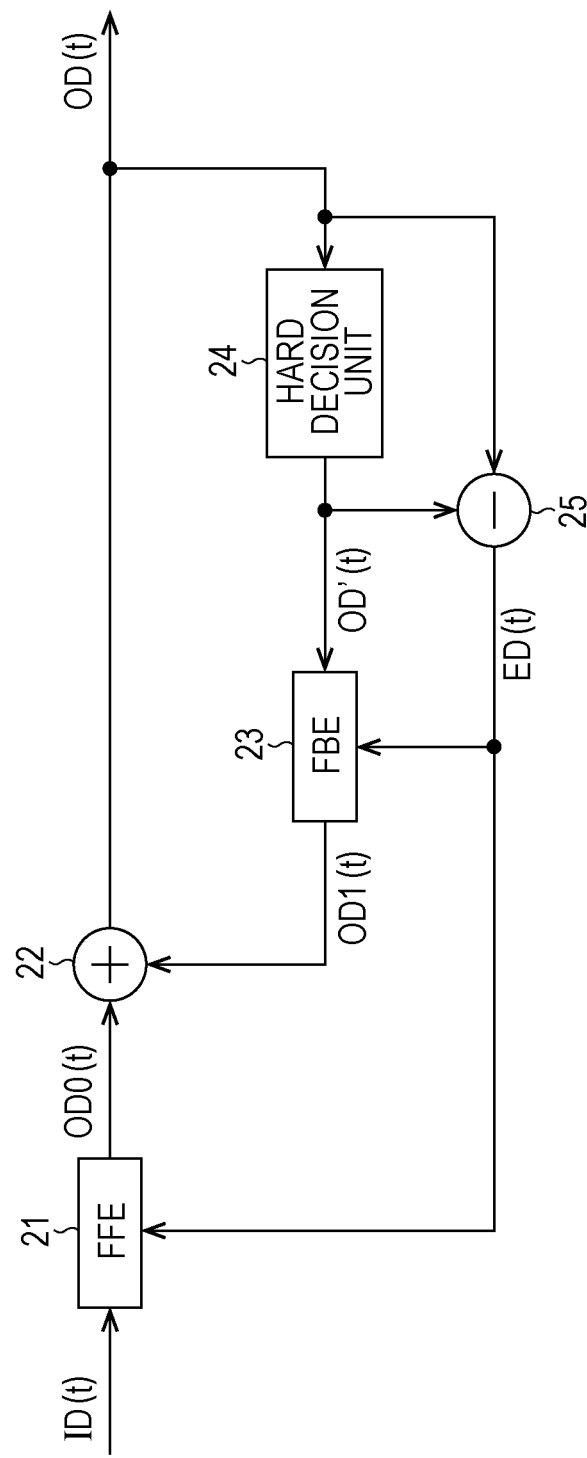
FIG. 1 is a view illustrating a configuration of a single carrier equalizer.

The frequency domain equalization unit 61 mainly has two functions. One function performs frequency domain equalization processing on an input signal which represents data transmitted by way of multicarrier transmission as described using FIG. 1, and generates and outputs equalized data. The equalized data output from the frequency domain equalization unit 61 is supplied to the frequency deinterleave unit 62. The other function performs frequency domain equalization processing on an input signal which represents data transmitted by way of single carrier transmission, and generates and outputs equalized data. The equalized data output from the frequency domain equalization unit 61 is supplied to the selector 64. Frequency domain processing upon single carrier transmission will be described below.

The frequency deinterleave unit 62 performs frequency deinterleave of returning to the original arrangement a symbol arrangement rearranged by frequency interleave performed on the transmission side, with respect to equalized data obtained by equalizing a signal transmitted by way of multicarrier transmission by the frequency domain equalization unit 61, and outputs the data to the selector 63.

Figure 2:
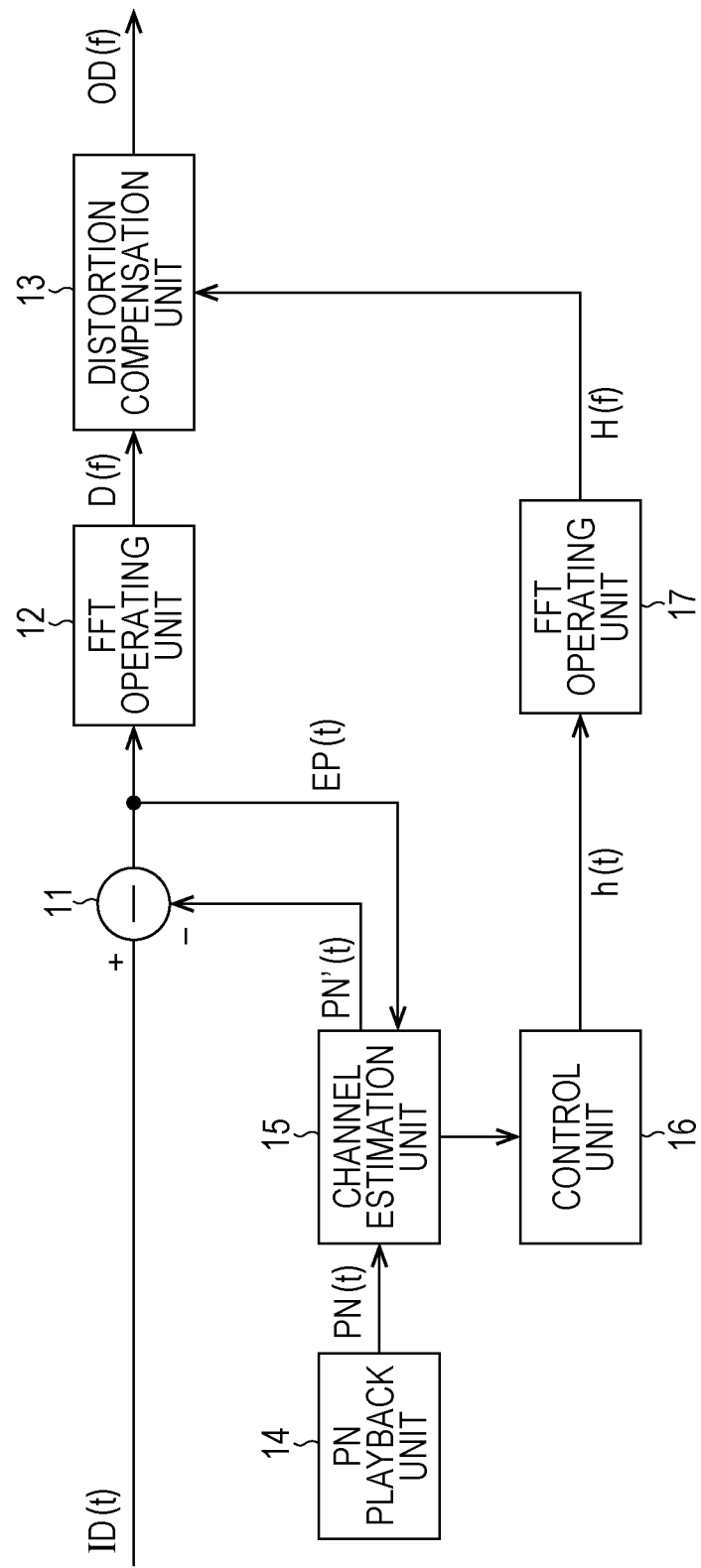
FIG. 2 is a view illustrating a configuration of a multicarrier equalizer.

The time domain equalization unit 65 performs time domain equalization processing on an input signal which represents data transmitted by way of single carrier transmission as described using FIG. 2, and generates and outputs equalized data. The equalized data output from the time domain equalization unit 65 is supplied to the selector 64.

The selector 64 selects one of equalized data obtained by performing frequency domain equalization on the signal transmitted by way of single carrier transmission by the frequency domain equalization unit 61 and equalized data obtained by performing time domain equalization on the signal by the time domain equalization unit 65, and outputs the equalized data to a selector 63 of a subsequent stage.

The selector 63 selects an output of the frequency deinterleave unit 62 or an output of the selector 64 according to a carrier mode to output. That is, upon multicarrier transmission, the output of the frequency deinterleave unit 62 is output, and, upon single carrier transmission, the output of the selector 64 is output.

Thus, in the equalization processing unit 57, the signal transmitted by way of multicarrier transmission is equalized in the frequency domain by the frequency domain equalization unit 61, is subjected to frequency deinterleave processing by the frequency deinterleave unit 62 and is output through the selector 63. The signal transmitted by way of single carrier transmission is selected by the selector 64 from a signal equalized in the frequency domain by the frequency domain equalization unit 61 and a signal equalized in the time domain by the time domain equalization unit 65, and is output through the selector 63.

[Example of Multicarrier Frequency Domain Equalization Processing]

Figure 8:
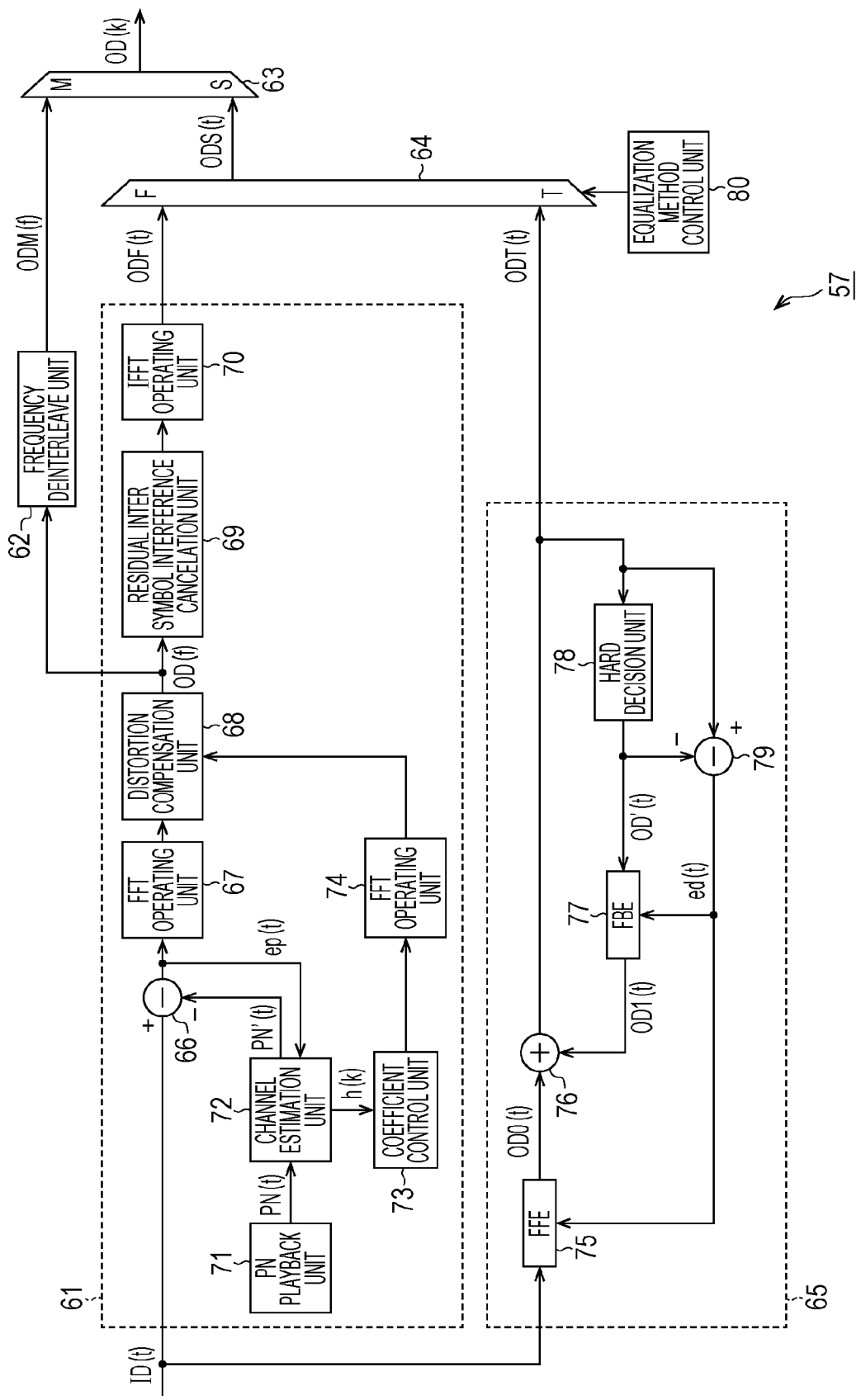
FIG. 8 is a view illustrating a detailed configuration example of an equalization processing unit.

FIG. 8 is a view illustrating a detailed configuration example of the equalization processing unit 57. The same components illustrated in FIG. 8 as those illustrated in FIG. 7 will be assigned the same reference numerals.

The frequency domain equalization unit 61 has a PN playback unit 71, a channel estimation unit 72, a subtractor 66, a FFT operating unit 67, a coefficient control unit 73, a FFT operating unit 74, a distortion compensation unit 68, a residual inter symbol interference cancelation unit 69 and an IFFT operating unit 70, and the time domain equalization unit 65 has a FFE 75, an adder 76, a FBE 77, a hard decision unit 78 and a subtractor 79. A time domain signal ID(t) output from the synchronization unit 56 is input to the subtractor 66 of the frequency domain equalization unit 61 and the FFE 75 of the time domain equalization unit 65.

First, a configuration of performing processing upon reception of data transmitted by way of multicarrier transmission will be described. Upon reception of data transmitted by way of multicarrier transmission, the PN playback unit 71, the channel estimation unit 72, the subtractor 66, the FFT operating unit 67, the coefficient control unit 73, the FFT operating unit 74, the distortion compensation unit 68 and the frequency deinterleave unit 62 of the frequency domain equalization unit 61 perform processing.

A signal transmitted by way of multicarrier transmission is an equalization target IQ signal, and the signal ID(t) input to the equalization processing unit 57 is a time domain signal of an OFDM signal and includes (a symbol of) a known PN sequence as a frame header. (FIG. 5)

The PN playback unit 71 plays back the very same PN sequence as a sequence generated and transmitted on the transmission side, that is, a PN sequence as a frame header, and supplies the PN sequence to the channel estimation unit 72.

The channel estimation unit 72 estimates channel characteristics of a channel in which a multicarrier signal is transmitted, from the multicarrier signal which is a multicarrier equalization processing target IQ signal, supplies an impulse response as (an estimation value of) the channel characteristics to the coefficient control unit 73, obtains a PN sequence influenced by the channel using the impulse response, that is, an estimated PN sequence (PN'(t)) and supplies the PN sequence to the subtractor 66. Further, the impulse response is sequentially updated using an error signal ep(t) supplied from the subtractor 66.

The subtractor 66 subtracts from the time domain (time region) multicarrier signal (referred to as a "multicarrier time domain signal" below) as a multicarrier signal which is supplied thereto and which is a multicarrier equalization processing target IQ signal the estimated PN sequence supplied from the channel estimation unit 72 to cancel the PN sequence as a frame header included in a multicarrier time domain signal, and supplies a PN canceled signal which is the multicarrier time domain signal from which this PN sequence is canceled, to the FFT operating unit 67.

The FFT operating unit 67 performs a FFT operation on the PN canceled signal supplied from the subtractor 66, obtains a multicarrier frequency domain signal which is a multicarrier signal in the frequency domain (frequency region), and outputs the multicarrier frequency domain signal to the distortion compensation unit 68.

The coefficient control unit 73 supplies the impulse response estimated by the channel estimation unit 72, to the FFT operating unit 74. Although described below, in the channel estimation unit 72, an adaptive filter generates an impulse response and a coefficient of each tap of this adaptive filter corresponds to an impulse response, and a plurality of coefficients read from each tap is serially rearranged and supplied to the FFT operating unit 74.

The FFT operating unit 74 calculates a transfer function as channel characteristics by performing a FFT operation on the impulse response supplied from the coefficient control unit 73, and supplies the transfer function to the distortion compensation unit 68.

The distortion compensation unit 68 corrects distortion of the multicarrier frequency domain signal distorted in a channel by compensating for distortion of the multicarrier frequency domain signal from the FFT operating unit 67 according to the transfer function as the channel characteristics from the FFT operating unit 74, and supplies the distortion corrected multicarrier frequency domain signal OD(f) to the frequency deinterleave unit 62 as a result of multicarrier equalization processing of the multicarrier signal.

Hereinafter, distortion compensation will be described. Some compensating methods are known, and distortion compensation performed by ZF (Zero Forcing) equalization or MMSE (Minimum Mean Square Error) equalization is generally used. For example, ZF equalization is performed by dividing the multicarrier frequency domain signal from the FFT operating unit 67 by the transfer function as the channel characteristics from the FFT operating unit 74.

The frequency deinterleave unit 62 performs frequency deinterleave of returning to the original arrangement a symbol arrangement rearranged by frequency interleave performed on the transmission side, with respect to the multicarrier frequency domain signal OD(f) supplied from the distortion compensation unit 68 as described using FIG. 7, and outputs the data to the selector 63.

The selector 63 is controlled according to a carrier mode, and supplies an output of the frequency deinterleave unit 62 as an equalization output result OD(k) of the equalization processing unit 57 to the error correction unit 58 of the subsequent stage upon multicarrier transmission.

As described above, in the equalization processing unit 57 which performs equalization processing upon multicarrier transmission, the channel estimation unit 72 in the frequency domain equalization unit 61 estimates an impulse response as channel characteristics and obtains an estimated PN sequence influenced by the channel characteristics.

Further, the subtractor 66 subtracts the estimated PN sequence influenced by the channel from the multicarrier time domain signal as the multicarrier signal to obtain a PN canceled signal from which the PN sequence as a frame header included in the multicarrier time domain signal is canceled.

Furthermore, the distortion compensation unit 68 compensates for distortion of the multicarrier frequency domain signal obtained by converting the PN canceled signal into a frequency domain signal according to a transfer function obtained by converting the impulse response of the channel characteristics obtained through the coefficient control unit 73 into a frequency domain signal to equalize the multicarrier frequency domain signal.

This equalized signal is subjected to frequency deinterleave processing, and is supplied to the error correction unit 58.

Upon multicarrier transmission, the above processing is performed as multicarrier equalization processing.

[Configuration of Channel Estimation Unit 72]

Figure 9:
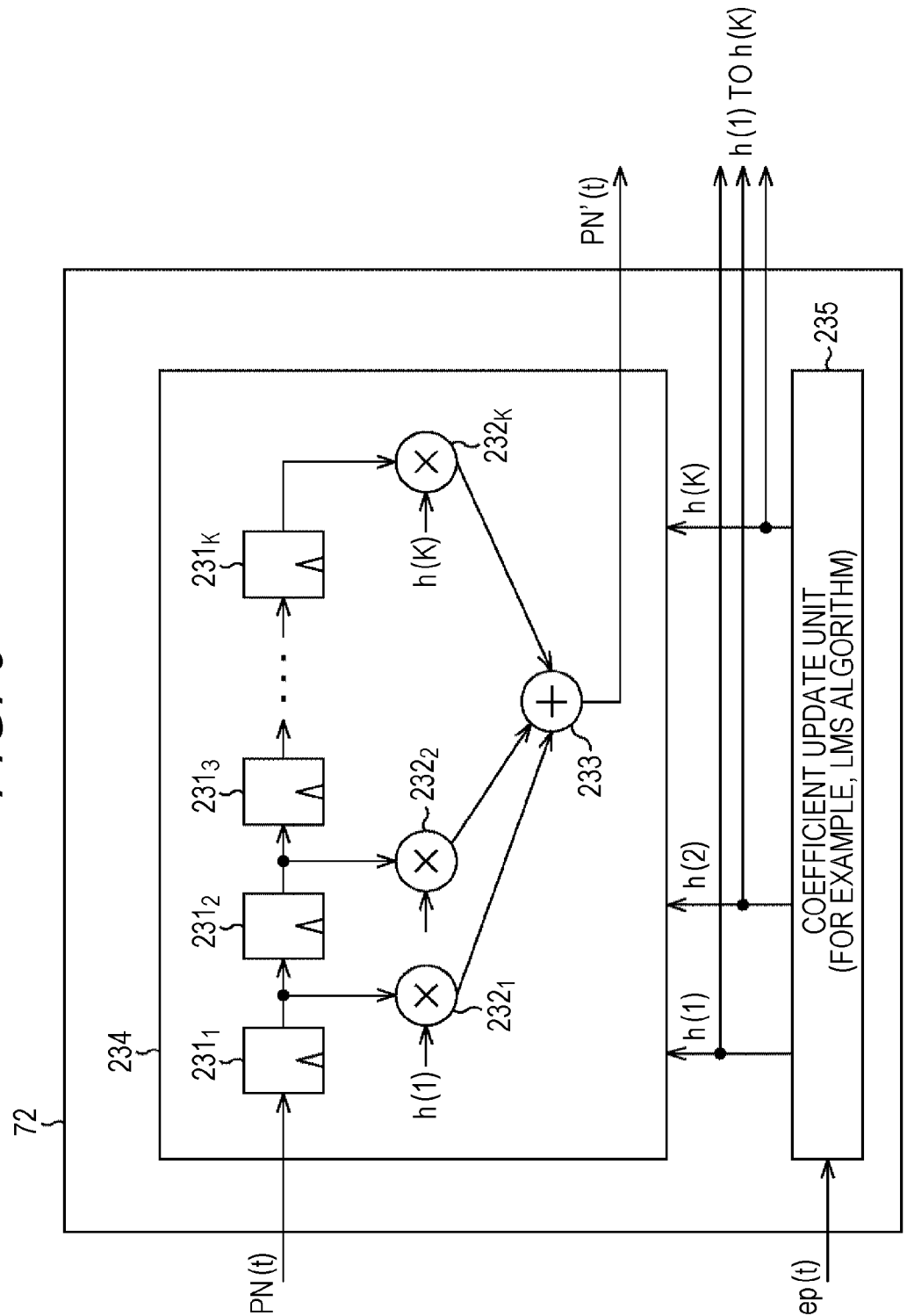
FIG. 9 is a view illustrating a configuration example of a channel estimation unit.

FIG. 9 is a block diagram illustrating a configuration example of the channel estimation unit 72 in FIG. 8.

The channel estimation unit 72 has a variable coefficient filter 234 and a coefficient update unit 235.

The variable coefficient filter 234 is a digital filter a tap coefficient of which is variable, and performs a product-sum operation on input data PN(t) input thereto and the tap coefficient and outputs this product-sum operation result PN'(t) as a filtering result of the input data.

That is, the variable coefficient filter 234 is a filter of K taps (FIR filter), and has K latch circuits $231_1, 231_2, \ldots,$ and $231_k$, K multipliers $232_1, 232_2, \ldots,$ and $232_k$ and an adder 233.

The K latch circuits $231_1$ to $231_k$ are connected in series, and the latch circuit $231_k$ (k=1, 2, ..., and K) receives a supply of input data latched by the latch circuit $231_{k-1}$ of a previous stage.

That is, the latch circuit $231_k$ latches input data latched by the latch circuit $231_{k-1}$ of a previous stage, and supplies the input data to the latch circuit $231_{k+1}$ of a subsequent stage and the multiplier $231_k$.

In addition, the first latch circuit $231_1$ which forms the variable coefficient filter 234 receives a supply of the PN sequence form the PN playback unit 71 in FIG. 8.

The multiplier $232_k$ receives a supply of input data from the latch circuit $231_k$ and, in addition, a supply of a tap coefficient corresponding to the impulse response of the channel characteristics from the coefficient update unit 235.

The multiplier $232_k$ multiplies the input data from the latch circuit $231_k$ and the tap coefficient h(k) which is a k-th value of the impulse response of the channel characteristics from the coefficient update unit 235, and supplies a resulting multiplication value (multiplication result) to the adder 233.

The adder 233 adds multiplication results supplied from the K multipliers $232_1$ to $232_k$, and outputs a resulting addition value PN'(t).

The coefficient update unit 235 updates tap coefficients h(1) to h(K) of the variable coefficient filter 234 to decrease an error of ep(t) which is an output result of the subtractor 66 in FIG. 8, that is, an error which is a result obtained by subtracting the PN sequence included in the multicarrier signal which is a multicarrier equalization processing target IQ signal and the estimated PN sequence supplied from the channel estimation unit 72, and supplies the tap coefficients to the variable coefficient filter 234.

Meanwhile, a method of updating the tap coefficient of the variable coefficient filter 234 in the coefficient update unit 235 is, for example, a LMS algorithm.

Hence, while, in the channel estimation unit 72, the coefficient update unit 235 obtains from the subtractor 66 a difference between the PN sequence included in the multicarrier signal which is the equalization target IQ signal and the estimated PN sequence, and updates coefficients to decrease an error based on a value of the difference according to an algorithm such as LMS, the variable coefficient filter 234 performs a product-sum operation, that is, convolution on the PN sequence supplied from the PN playback unit 71 and the tap coefficient supplied from the coefficient update unit 235, that is, the impulse response of the channel characteristics, and supplies a result obtained by filtering the PN sequence according to the channel characteristics to the subtractor 66 as the estimated PN sequence.

[Example of Single Carrier Frequency Domain Equalization Processing]

Next, a configuration of performing processing upon reception of data transmitted by way of single carrier transmission will be described using FIG. 8. Upon reception of data transmitted by way of single carrier transmission, equalization processing is performed using roughly two equalization methods, that is, frequency domain equalization performed by the frequency domain equalization unit 61 and time domain equalization performed by the time domain equalization unit 65.

First, a frequency domain equalization method performed by the frequency domain equalization unit 61 will be described.

Although the PN playback unit 71, the channel estimation unit 72, the subtractor 66, the FFT operating unit 67, the coefficient control unit 73, the FFT operating unit 74, the distortion compensation unit 68, the residual inter symbol interference cancelation unit 69 and the IFFT operating unit 70 of the frequency domain equalization unit 61 perform processing, operations of the PN playback unit 71, the channel estimation unit 72, the subtractor 66, the FFT operating unit 67, the coefficient control unit 73, the FFT operating unit 74 and the distortion compensation unit 68 are almost the same as processing of equalizing a multicarrier signal upon above multicarrier transmission.

This is because, as is clear from a frame configuration of a single carrier signal in FIG. 4 and a frame configuration of a multicarrier signal in FIG. 5, a PN sequence is applied as a frame header in a time domain likewise according to both of transmission methods and the frequency domain unit 61 which equalizes a multicarrier signal upon above multicarrier transmission performs equalization processing using this PN sequence, and therefore the operation is almost the same even upon single carrier transmission. In other words, a configuration required by multicarrier equalization has no huge impact in terms of a circuit scale and can be used to equalize in the frequency domain a single carrier signal transmitted by way of single carrier transmission.

A signal transmitted by way of single carrier transmission is an equalization target IQ signal, and the signal ID(t) input to the equalization processing unit 57 is a single carrier time domain signal and includes (a symbol of) a known PN sequence as a frame header. (FIG. 4)

The PN playback unit 73 plays back the very same PN sequence as a sequence generated and transmitted on the transmission side, that is, a PN sequence as a frame header, and supplies the PN sequence to the channel estimation unit 72.

The channel estimation unit 72 estimates channel characteristics of a channel in which a single carrier signal is transmitted, from the single carrier signal which is a single carrier equalization processing target IQ signal, supplies an impulse response as (an estimation value of) the channel characteristics to the coefficient control unit 73, obtains a PN sequence influenced by the channel using the impulse response, that is, an estimated PN sequence (PN'(t)) and supplies the PN sequence to the subtractor 66. Further, the impulse response is sequentially updated using an error signal ep(t) supplied from the subtractor 66.

Furthermore, very similar to the operation described using FIG. 9, that is, upon single carrier equalization processing, too, the channel estimation unit 72 performs the same processing as multicarrier equalization processing.

The subtractor 66 subtracts from the time domain signal as a single carrier signal which is supplied thereto and which is a single carrier equalization processing target IQ signal the estimated PN sequence supplied from the channel estimation unit 72 to cancel the PN sequence as a frame header included in the single carrier time domain signal, and supplies a PN canceled signal which is the signal from which this PN sequence is canceled, to the FFT operating unit 67.

The FFT operating unit 67 performs a FFT operation on the PN canceled signal supplied from the subtractor 67, obtains a single carrier frequency domain signal in the frequency domain, and outputs the single carrier frequency domain signal to the distortion compensation unit 68.

Meanwhile, similar to equalization of a multicarrier signal upon multicarrier transmission, the FFT operating unit 67 performs a FFT operation on 3780 symbols corresponding to a frame body length obtained by canceling a PN sequence from one frame.

The coefficient control unit 73 supplies the impulse response estimated by the channel estimation unit 72, to the FFT operating unit 74. In the channel estimation unit 72, impulse responses are generated by the variable coefficient filter 234 and the coefficient update unit 235 which are adaptive filters in FIG. 9, coefficients of each tap of the adaptive filters correspond to impulse responses, and a plurality of coefficients read from each tap is rearranged in serial order and supplied to the FFT operating unit 74.

The FFT operating unit 74 calculates a transfer function as channel characteristics by performing a FFT operation on the impulse response supplied from the coefficient control unit 73, and supplies the transfer function to the distortion compensation unit 68.

The distortion compensation unit 68 compensates for distortion of the single carrier frequency domain signal from the FFT operating unit 67 according to the transfer function as the channel characteristics from the FFT operating unit 74 to correct distortion of the single carrier frequency domain signal distorted in a channel, and supplies this distortion corrected single carrier frequency domain signal OD(f) to the residual inter symbol interference cancelation unit 69.

Similar to multicarrier equalization, a distortion compensation method includes distortion compensation using ZF (Zero Forcing) equalization or MMSE (Minimum Mean Square Error) equalization.

The residual inter symbol interference cancelation unit 69 cancels a residual inter symbol interference (RISI) from the equalized signal supplied from the distortion compensation unit 68, and supplies the signal to the IFFT operating unit 70.

Hereinafter, the residual inter symbol interference cancelation unit will be described. Although the distortion compensation unit 68 performs equalization processing using ZF equalization or MMSE equalization, when, for example, MMSE equalization is used, MMSE equalization $Z_{m,n}$ is represented by equation (1).

[Mathematical 1]

$$Z_{m,n} = X_{m,n} - \frac{\sigma^2 \cdot X_{m,n}}{|H_{m,n}|^2 + \sigma^2} + \frac{H^*_{m,n} \cdot N_{m,n}}{|H_{m,n}|^2 + \sigma^2} \quad (1)$$

Meanwhile, in equation (1), $X_{m,n}$ is a signal obtained by converting a transmission signal in the frequency domain, $H_{m,n}$ is a signal (transfer function) obtained by converting an impulse response of channel characteristics in the frequency domain, $\sigma^2$ is noise power, $N_{m,n}$ is a noise signal at each frequency position, m is a frame number and n is a carrier number (frequency position).

$-(\sigma^2 \cdot X_{m,n})/(|H_{m,n}|^2 + \sigma^2)$ which is the second term on the right side of equation (1) is a component corresponding to a residual inter symbol interference, and the residual inter symbol interference cancelation unit 69 can cancel a residual inter symbol interference by canceling $-(\sigma^2 \cdot X_{m,n})/(|H_{m,n}|^2 + \sigma^2)$ from an equalized signal.

The IFFT operating unit 70 performs an IFFT operation on the residual inter symbol interference canceled signal supplied from the residual inter symbol interference cancelation unit 69, and supplies the resulting time domain single carrier signal to the selector 64 as a result ODF(t) obtained by equalizing in the frequency domain a single carrier signal input to the subtractor 66.

[Example of Single Carrier Time Domain Equalization Processing]

Next, a time domain equalization method performed by the time domain equalization unit 65 according to a configuration of performing processing upon reception of data transmitted by way of single carrier transmission will be described using FIG. 8.

The time domain equalization unit 65 illustrated in FIG. 8 has a FFE 75, an adder 76, a FBE 77, a hard decision unit 78 and a subtractor 79, and the time domain signal ID(t) output from the synchronization unit 56 is input to the FFE 75 of the time domain equalization unit 65.

The FFE 75 is a feed forward equalizer and is formed with an adaptive equalization filter. Although details will be described below, the FFE has a variable coefficient filter and a coefficient update unit.

A product-sum operation is performed on the input data ID(t) input to the FFE 75 and a tap coefficient, and this product-sum operation result is output as a filtering result OD0(t) of the input data.

Further, the coefficient update unit sequentially updates coefficients based on the error signal ed(t) output from the subtractor 79.

The FBE 77 is a feed back equalizer and is formed with an adaptive equalization filter similar to the FFE 75, and, although details will be described below, has a variable coefficient filter and a coefficient update unit.

The FBE 77 receives a supply of a hard decision result OD'(t) output from the hard decision unit 78, performs a product-sum operation on this signal as an input and a tap coefficient, and outputs this product-sum operation result as a filtering result OD1(t) of input data.

Further, the coefficient update unit sequentially updates coefficients based on the error signal ed(t) output from the subtractor 79.

The adder 76 adds the filtering result OD0(t) of the FFE 75 and the filtering result OD1(t) of the FBE 77, and outputs the resulting addition value to the selector 64 as a result ODT(t) obtained by equalizing in the time domain a single carrier signal input to the FFE 75.

Further, the adder 76 supplies the addition result to the hard decision unit 78 and the subtractor 79.

The hard decision unit 78 performs hard decision on the addition value supplied from the adder 76, and supplies this hard decision result OD'(t) to the subtractor 79 and to the FBE 77.

The subtractor 79 subtracts the hard decision result OD' (t) supplied from the hard decision unit 78, from the equalized signal ODT(t) supplied from the adder 76, and obtains the error signal ed(t). The error signal ed(t) is supplied to the FFE 75 and the FBE 77, and is used to update coefficients.

The selector 64 is controlled according to a control signal supplied from the equalization method control unit 80, and supplies one of the equalization result ODF(t) obtained by equalizing the single carrier signal in the frequency domain by the frequency domain equalization unit 61 and the equalization result ODT(t) obtained by equalizing the single carrier signal in the time domain by the time domain equalization unit 65, to the selector 63 as the equalization result ODS(t) of the single carrier signal.

The equalization method control unit 80 selects an equalization result of better signal quality from the frequency domain equalization result ODF(t) of the frequency domain equalization unit 61 and the time domain equalization result ODT(t) of the time domain equalization unit 65, and outputs a control signal to the selector 64 such that this equalization method result is supplied to the selector 63 of a subsequent stage.

In addition, a selection method will be described below using another configuration example of the equalization processing unit 57.

The selector 63 is controlled according to a carrier mode, and supplies an output of the selector 64 as an equalization output result OD(k) of the equalization processing unit 57 to the error correction unit 58 of the subsequent stage upon single carrier transmission.

As described above, the equalization processing unit 57 which performs equalization processing upon single carrier transmission performs frequency domain equalization performed by the frequency domain equalization unit 61 and time domain equalization performed by the time domain equalization unit 65.

Upon frequency domain equalization performed by the frequency domain equalization unit 61, the channel estimation unit 72 in the frequency domain equalization unit 61 estimates an impulse response as channel characteristics and obtains an estimated PN sequence (PN'(t)) influenced by the channel characteristics.

Further, the subtractor 66 subtracts the estimated PN sequence influenced by the channel from the time domain signal as the single carrier signal to obtain a PN canceled signal from which the PN sequence as a frame header included in the time domain signal is canceled.

Furthermore, the distortion compensation unit 68 compensates for distortion of the single carrier frequency domain signal obtained by converting the PN canceled signal into a frequency domain signal according to a transfer function obtained by converting the impulse response of the channel characteristics obtained through the coefficient control unit 73 into a frequency domain signal to equalize the single carrier frequency domain signal.

Subsequently, a single carrier time domain signal from which a residual inter symbol interference component is canceled by the residual inter symbol interference cancelation unit 69 and then is converted back into a time domain signal by the IFFT operating unit 70 is output as a frequency domain equalization result.

Upon time domain equalization performed by the time domain equalization unit 65, a single carrier signal is equalized by the FFE 75 and the FBE 77 formed with adaptive filters.

Meanwhile, the FFE 75 and the FBE 77 have variable coefficient filters and coefficient update units. The FFE 75 outputs a result obtained by performing a product-sum operation on the input data ID(t) by the variable coefficient filter, and the FBE 77 outputs a result obtained by performing at the variable filter a product-sum operation on the hard decision result OD' (t) as an input obtained by hard decision on the equalization result ODT(t) by the hard decision unit 78. The time domain equalization unit 65 outputs as a time domain equalization result a result obtained by adding these two product-sum operation results by the adder 76.

Further, the FFE 75 and the FBE 77 sequentially update coefficients to decrease this error signal which is a difference between an equalization result and a hard decision result obtained by performing hard decision on the equalization result.

Upon single carrier transmission, a result of equalization in the frequency domain and a result of equalization in the time domain are obtained by the above processing, and one of these results is output and supplied to the error correction unit 58 of a subsequent stage.

Upon single carrier transmission, the above processing in the frequency domain and the time domain is performed as single carrier equalization processing.

[Configuration of FFE 75]

Figure 10:
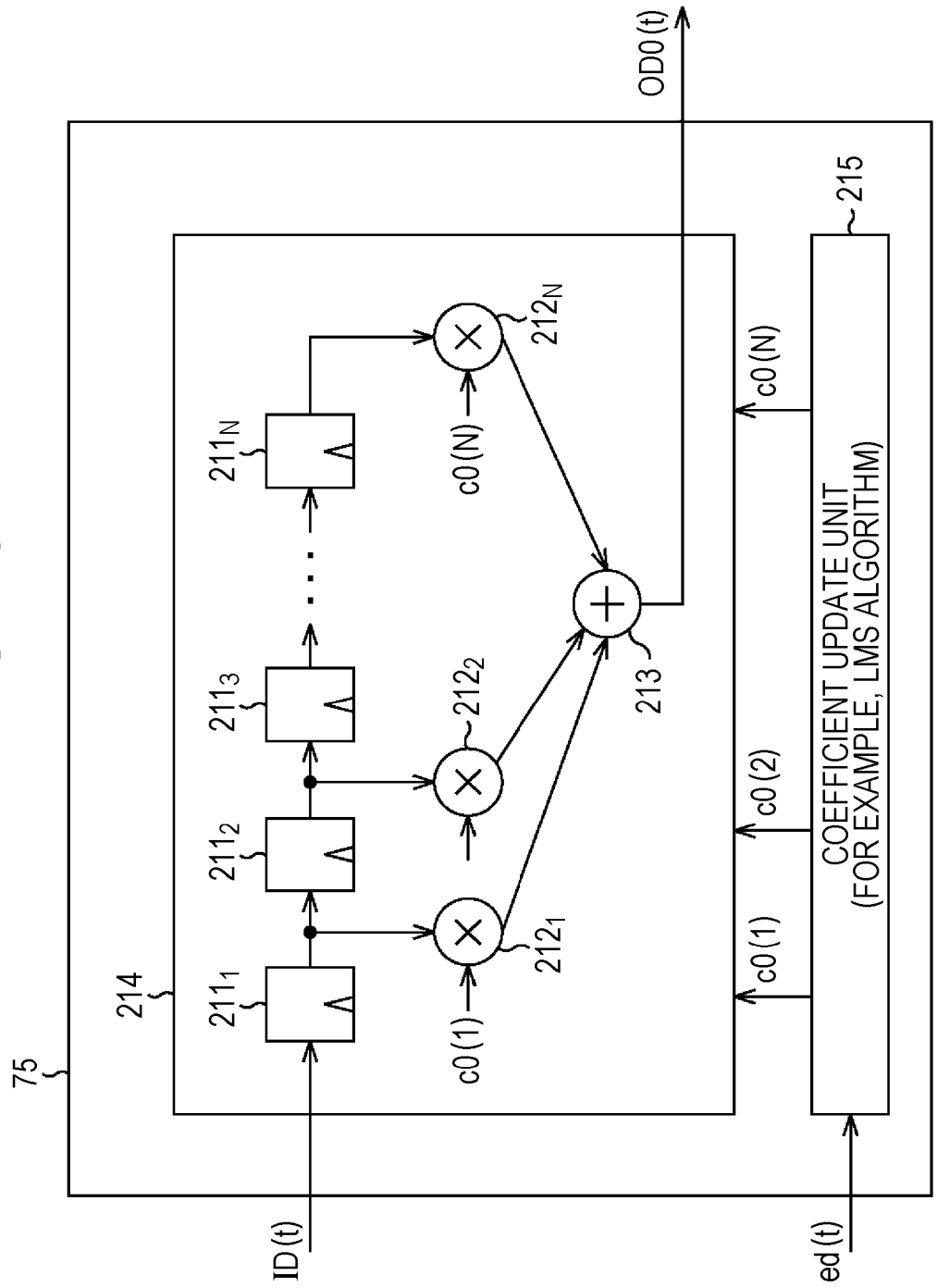
FIG. 10 is a view illustrating a configuration example of a FFE.

FIG. 10 is a block diagram illustrating a configuration example of the FFE 75 in FIG. 8.

The FFE 75 has the variable coefficient filter 214 and the coefficient update unit 215.

The variable coefficient filter 214 is a digital filter a tap coefficient of which is variable, and performs a product-sum operation on input data ID(t) input thereto and the tap coefficient and outputs a product-sum operation result OD0(t) as a filtering result of the input data.

That is, the variable coefficient filter 214 is a filter of N taps (FIR filter), and has N latch circuits $211_1, 211_2, \ldots,$ and $211_N$, N multipliers $212_1, 212_2, \ldots,$ and $212_N$ and an adder 213.

The N latch circuits $211_1$ to $211_N$ are connected in series, and the latch circuit $211_n$ (n=1, 2, ..., and N) receives a supply of input data latched by the latch circuit $211_{n-1}$ of a previous stage.

That is, the latch circuit $211_n$ latches input data latched by the latch circuit $211_{n-1}$ of a previous stage, and supplies the input data to the latch circuit $211_{n+1}$ of a subsequent stage and the multiplier $212_n$.

In addition, the first latch circuit $211_1$ which forms the variable coefficient filter 214 receives a supply of the input data ID(t) of the equalization processing unit 57 in FIG. 8.

The multiplier $212_n$ receives a supply of the input data from the latch circuit $211_n$, and receives a supply of a tap coefficient c0(n) from the coefficient update unit 215.

The multiplier $212_n$ multiplies the input data from the latch circuit $211_n$ and the tap coefficient c0(n) from the coefficient update unit 215, and supplies the resulting multiplication value to the adder 213.

The adder 213 adds multiplication results supplied from the N multipliers $212_1$ to $212_N$, and outputs a resulting addition value OD0(t).

The coefficient update unit 215 updates tap coefficients c0(1) to c0(N) of the variable coefficient filter 214 to decrease an error of ed(t) which is an output result of the subtractor 79 in FIG. 8, that is, an error signal ed(t) which is a result obtained by subtracting the hard decision result OD'(t) supplied from the hard decision unit 78 from the equalized signal ODT(t) supplied from the adder 76, and supplies the tap coefficients to the variable coefficient filter 214.

A method of updating the tap coefficients of the variable coefficient filter 214 in the coefficient update unit 215 is, for example, a LMS algorithm.

Meanwhile, the FFE 75 forms a feed forward equalizer, and the addition value output from the adder 213 is supplied to the adder 76 in FIG. 8 as an output of the FFE 75.

[Configuration of FBE 77]

Figure 11:
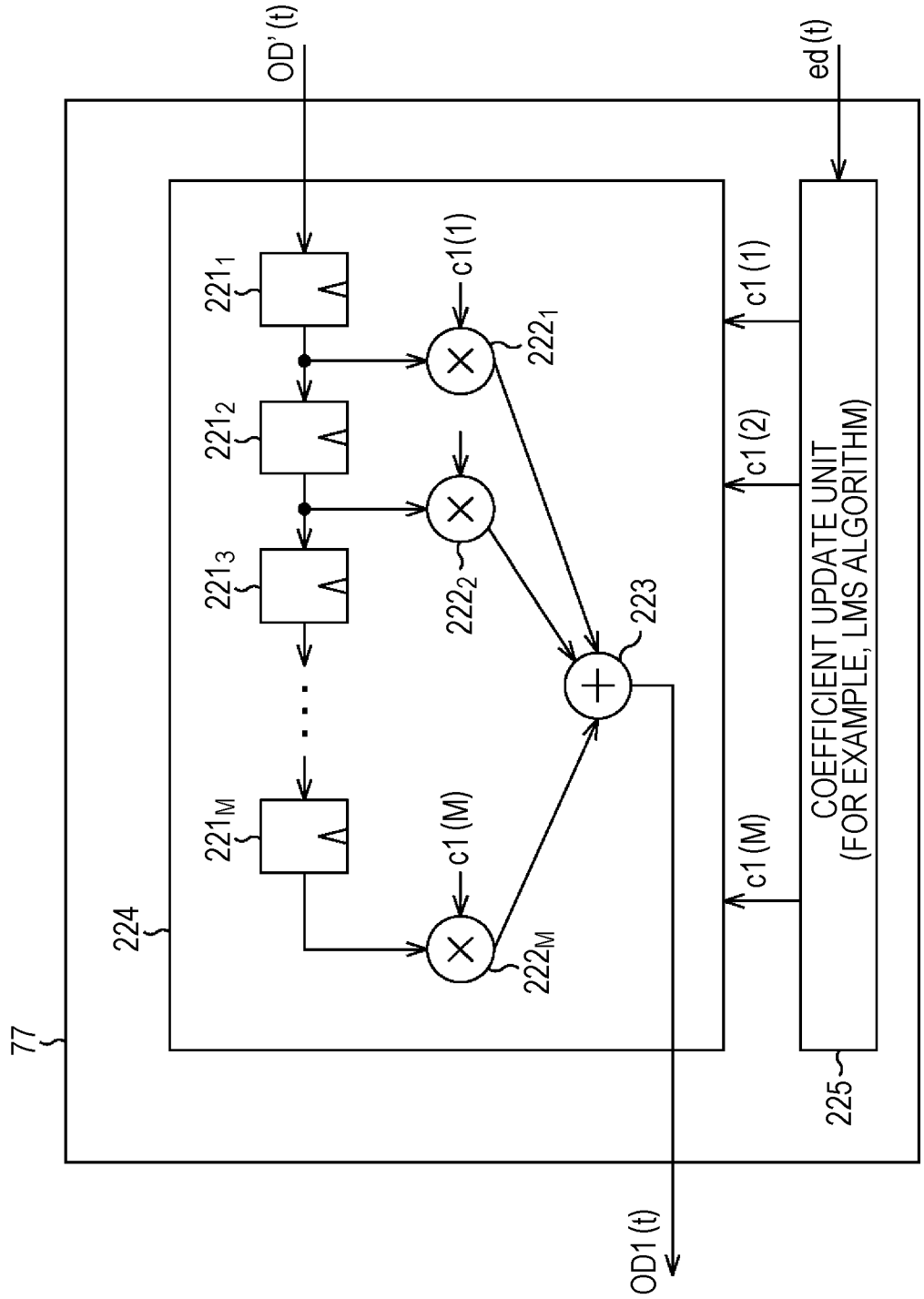
FIG. 11 is a view illustrating a configuration example of a FBE.

FIG. 11 is a block diagram illustrating a configuration example of the FBE 77 in FIG. 8.

The FBE 77 has the variable coefficient filter 224 and the coefficient update unit 225.

The variable coefficient filter 224 is a digital filter a tap coefficient of which is variable, and performs a product-sum operation on hard decision result OD'(t) input thereto and the tap coefficient and outputs this product-sum operation result OD1(t) as a filtering result of the input data.

That is, the variable coefficient filter 224 is a filter of M taps (FIR filter), and has M latch circuits $221_1$, $221_2$, ..., and $221_M$, M multipliers $222_1$, $222_2$, ..., and $222_M$ and an adder 223.

The M latch circuits $221_1$ to $221_M$ are connected in series, and the latch circuit $221_m$ (m=1, 2, ..., and M) receives a supply of input data latched by the latch circuit $221_{m-1}$ of a previous stage.

That is, the latch circuit $221_m$ latches input data latched by the latch circuit $221_{m-1}$ of a previous stage, and supplies the input data to the latch circuit $221_{m+1}$ of a subsequent stage and the multiplier $222_m$.

In addition, the first latch circuit $221_1$ which forms the variable coefficient filter 224 receives a supply of the hard decision result OD'(t) of the equalization processing unit 57 in FIG. 8.

The multiplier $222_m$ receives a supply of the input data from the latch circuit $221_m$, and receives a supply of a tap coefficient c1(m) from the coefficient update unit 225.

The multiplier $222_m$ multiplies the input data from the latch circuit $221_m$ and the tap coefficient c1(m) from the coefficient update unit 225, and supplies the resulting multiplication value to the adder 223.

The adder 223 adds multiplication results supplied from the M multipliers $222_1$ to $222_M$, and outputs a resulting addition value OD1(t).

The coefficient update unit 225 updates tap coefficients c1(1) to c1(M) of the variable coefficient filter 224 to decrease an error of ed(t) which is an output result of the subtractor 79 in FIG. 8, that is, an error of an error signal ed(t) which is a result obtained by subtracting the hard decision result OD'(t) supplied from the hard decision unit 78 from the equalized signal ODT(t) supplied from the adder 76, and supplies the tap coefficients to the variable coefficient filter 224.

A method of updating the tap coefficients of the variable coefficient filter 224 in the coefficient update unit 225 is, for example, a LMS algorithm.

Meanwhile, the FBE 77 forms a feed back equalizer, and the addition value output from the adder 223 is supplied to the adder 76 in FIG. 8 as an output of the FBE 77.

Upon single carrier equalization configured by the FFE 75 and the FBE 77 as described above, processing of equalizing a single carrier signal in the feed forward equalizer formed by the FFE 75 and equalizing this equalization result in a DFE (Decision Feedback Equalizer) formed with the FBE 77, the adder 76, and the hard decision unit 78 is performed as time domain single carrier equalization processing.

[Second Configuration Example of Equalization Processing Unit 57]

Figure 12:
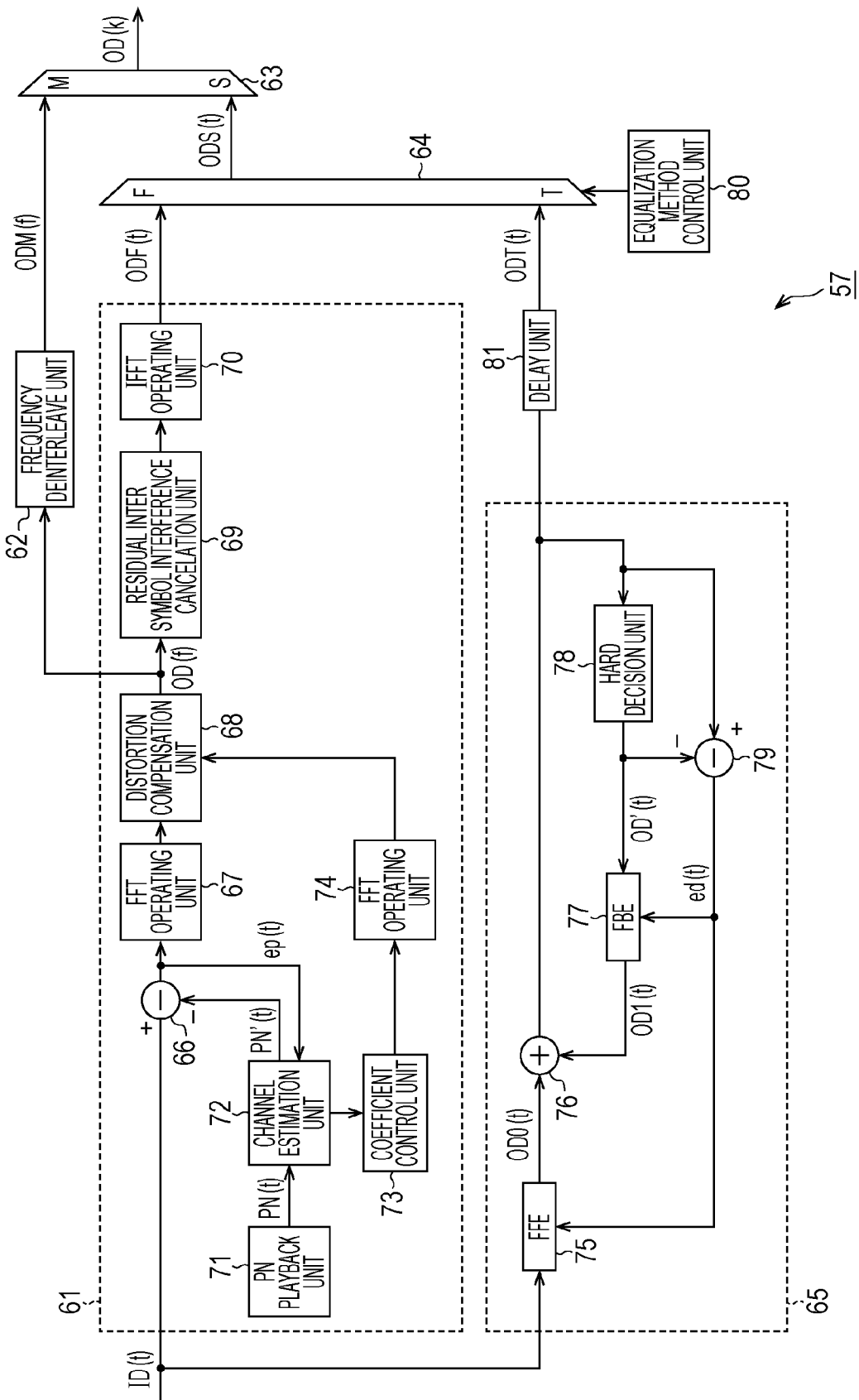
FIG. 12 is a view illustrating a second detailed configuration example of the equalization processing unit.

FIG. 12 is a view illustrating a second detailed configuration example of the equalization processing unit 57. The same components illustrated in FIG. 12 as those illustrated in FIG. 8 will be assigned the same reference numerals. Overlapping description will be skipped where necessary.

A configuration of the equalization processing unit 57 illustrated in FIG. 12 differs from FIG. 8 in adding a delay unit 81.

According to equalization processing upon multicarrier transmission, an equalized multicarrier signal output from the distortion compensation unit 68 in the frequency domain equalization unit 61 is supplied to the frequency deinterleave unit 62, is subjected to frequency deinterleave of returning a symbol rearrangement to the original rearrangement and is supplied to the error correction unit 58 of a subsequent stage by the selector 63.

Hence, the delay unit 81 added in FIG. 12 has no influence on an operation upon multicarrier equalization.

In FIG. 8, when equalization processing is performed upon single carrier transmission, the equalization processing unit 57 supplies a frequency domain equalization result ODF(t) of the frequency domain equalization unit 61 and a time domain equalization result ODT(t) of the time domain equalization unit 65 to the selector 64.

In this case, although both of the frequency domain equalization unit 61 and the time domain equalization unit 65 perform equalization processing on the single carrier signal input ID(t), and the frequency domain equalization unit 61 has a FFT operating unit 67 and an IFFT operating unit 70 which each perform a FFT operation and an IFFT operation.

Generally, blocks which perform processing of a FFT operation and an IFFT operation are configured to have input buffers or work buffers, and a frequency domain equalization result ODF(t) of the frequency domain equalization unit 61 and a time domain equalization result ODF(t) of the time domain equalization unit 65 include a shift between output timings in frame units, that is, the frequency domain equalization result ODF(t) is output several frames behind the time domain equalization result ODT(t).

The delay unit 81 performs processing of adding a delay which occurs in the frequency domain equalization unit 61, to the time domain equalization result output from the time domain equalization unit 65 to cancel the above shift between timings, and supplies the time domain equalization result to the selector 64.

This is to coordinate timings of the frequency domain equalization result ODF(t) of the frequency domain equalization unit 61 and the time domain equalization result ODT(t) of the time domain equalization unit 65, and output timings may be coordinated by also using the time domain equalization result by sharing resources of the existing FFT operating unit 74 and IFFT operating unit 70 instead of adding the delay unit 81 as a memory and directly supplying the time domain equalization result ODF(t) to the selector 64. Naturally, in this case, processing of the distortion compensation unit 68 and the residual inter symbol interference cancelation unit 69 is skipped.

By coordinating the output timings of the frequency domain equalization result ODF(t) of the frequency domain equalization unit 61 and the time domain equalization result ODT(t) of the time domain equalization unit 65 as described above, the selector 64 can switch an equalization method even during demodulation of a single carrier signal.

[Third Configuration Example of Equalization Processing Unit 57]

Figure 13:
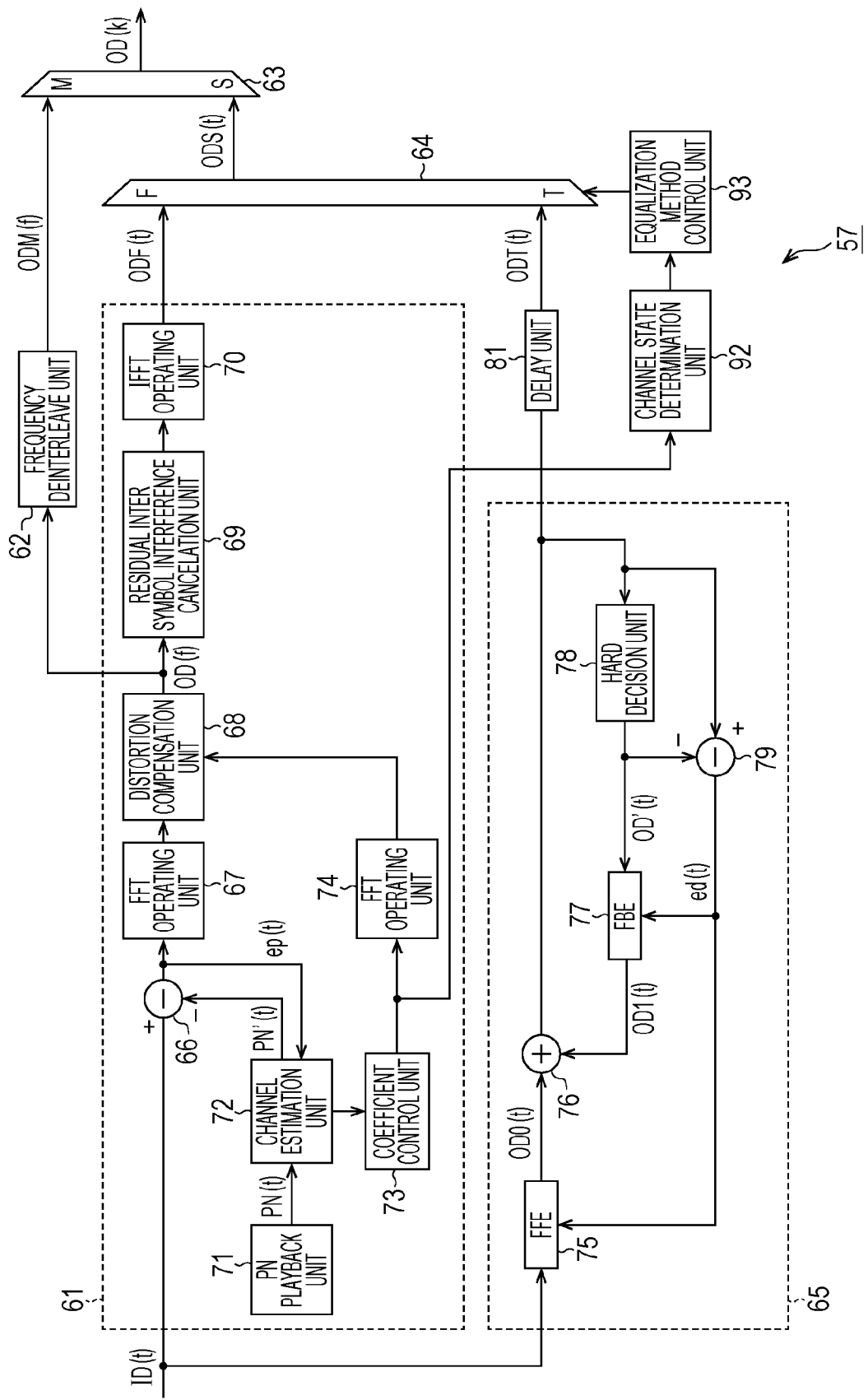
FIG. 13 is a view illustrating a third detailed configuration example of the equalization processing unit.

FIG. 13 is a view illustrating a third detailed configuration example of the equalization processing unit 57. The same components illustrated in FIG. 13 as those illustrated in FIG. 12 will be assigned the same reference numerals. Overlapping description will be skipped where necessary.

A configuration of the equalization processing unit 57 illustrated in FIG. 13 differs from that in FIG. 12 in adding a channel state determination unit 92 and causing an equalization method control unit 93 to operate based on the channel state determination unit 92.

As to an operation of equalization processing upon multicarrier transmission, the added channel state determination unit 92 and the equalization method control unit 93 have no influence on the operation upon multicarrier equalization.

When equalization processing is performed upon single carrier transmission, the equalization processing unit 57 supplies a frequency domain equalization result ODF(t) of the frequency domain equalization unit 61 and a time domain equalization result ODT(t) of the time domain equalization unit 65 to the selector 64.

The selector 64 is controlled by the equalization method control unit 93, and supplies one of the equalization results to a subsequent stage. FIG. 13 is a view illustrating one configuration example related to a method of controlling this equalization method.

The channel state determination unit 92 receives an input of an impulse response as (an estimated value of) channel characteristics output from the coefficient control unit 73 in the frequency domain equalization unit 61, determines a channel state based on this impulse response, and supplies this determination result to the equalization method control unit 93.

The equalization method control unit 93 controls the selector 64 based on the determination result supplied from the channel state determination unit 92, and supplies one of the frequency domain equalization result ODF(t) of the frequency domain equalization unit 61 and the time domain equalization result ODF(t) of the time domain equalization unit 65 to be supplied to the selector 64, to the selector 63 as an equalization result ODS(t) upon single carrier transmission.

The above operation is to cause the channel state determination unit 92 to determine a channel state and the equalization method control unit 93 to select a better equalization result from the frequency domain equalization result and the time domain equalization result.

Figure 14:
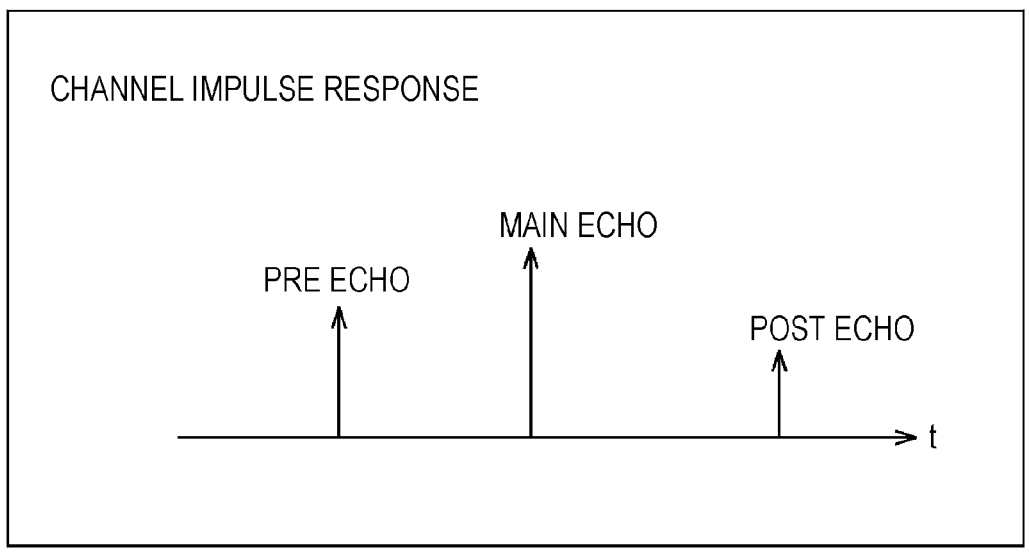
FIG. 14 is a view illustrating an example of a channel impulse response.

FIG. 14 is a view illustrating an example of a channel impulse response.

This view illustrates a channel impulse response in multipath environment including three waves of multipaths of a pre echo, a main echo and a post echo.

In a pre echo channel, frequency domain equalization is generally better than time domain equalization. Hence, it is determined that there is a pre echo illustrated in FIG. 14 according to an impulse response of channel characteristics output from the coefficient control unit 73 as an example of a determination condition of the channel state determination unit 92, and, when it is determined there is the pre echo, this determination information is supplied to the equalization method control unit 93, and control is performed such that the equalization method control unit 93 selects the frequency domain equalization result ODF(t) of the frequency domain equalization unit 61.

[Fourth Configuration Example of Equalization Processing Unit 57]

Figure 15:
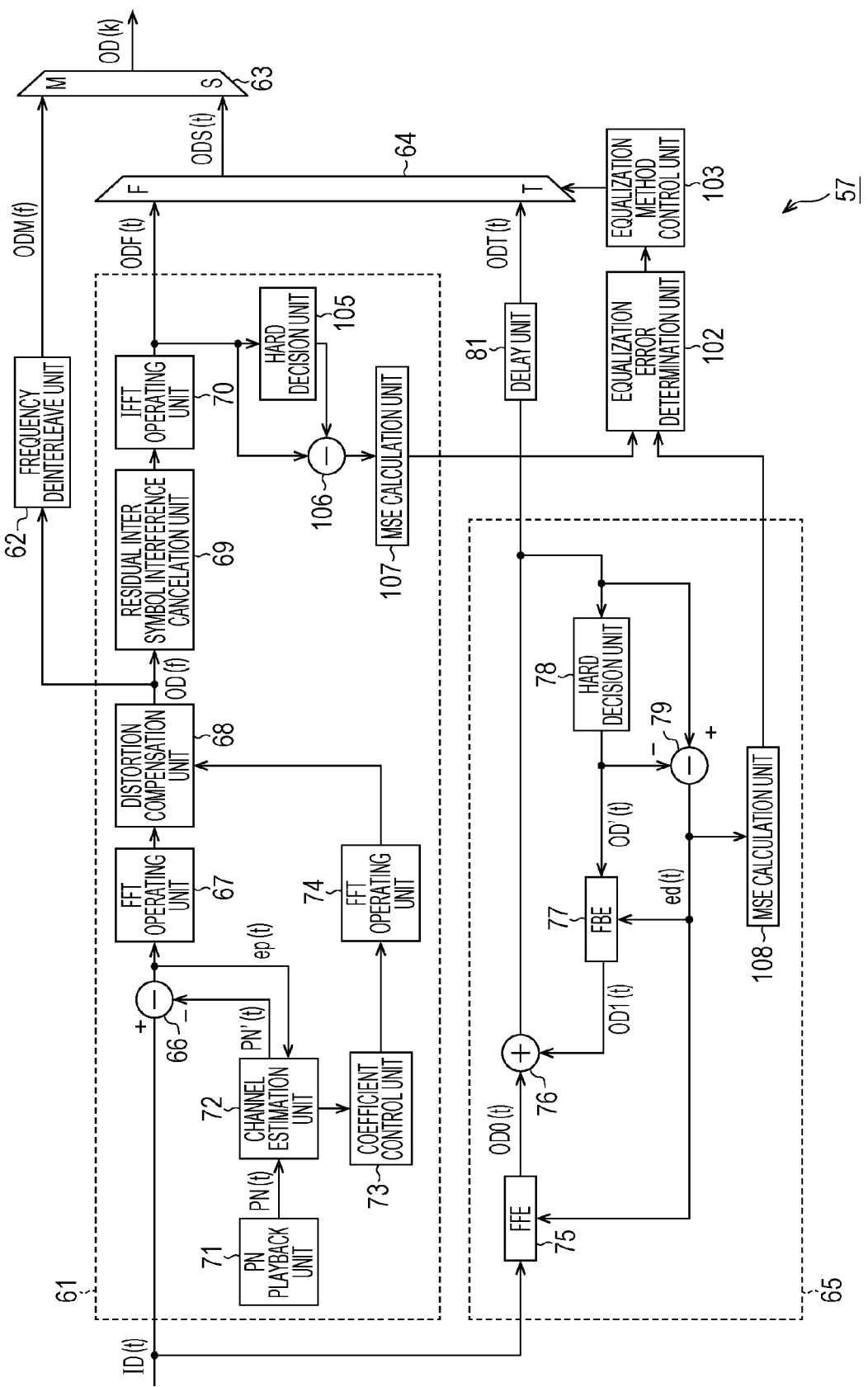
FIG. 15 is a view illustrating a fourth configuration example of the equalization processing unit.

FIG. 15 is a view illustrating a fourth detailed configuration example of the equalization processing unit 57. The same components illustrated in FIG. 15 as those illustrated in FIG. 12 will be assigned the same reference numerals. Overlapping description will be skipped where necessary.

A configuration of the equalization processing unit 57 illustrated in FIG. 15 differs from that in FIG. 12 in adding a hard decision unit 105, a subtractor 106, and a MSE calculation unit 107 in the frequency domain equalization unit 61, adding a MSE calculation unit 108 and an equalization error determination unit 102 in the time domain equalization unit 65, and causing the equalization method control unit 103 to operate based on the equalization error determination unit 102.

As to an operation of equalization processing upon multicarrier transmission, the added equalization error determination unit 102 and equalization method control unit 103 have no influence on the operation upon multicarrier equalization.

When equalization processing is performed upon single carrier transmission, the equalization processing unit 57 supplies a frequency domain equalization result ODF(t) of the frequency domain equalization unit 61 and a time domain equalization result ODT(t) of the time domain equalization unit 65 to the selector 64.

The selector 64 is controlled by the equalization method control unit 103, and supplies one of the equalization results to a subsequent stage. FIG. 15 is a view illustrating one configuration example related to a method of controlling this equalization method.

The hard decision unit 105 performs hard decision on an equalized time domain single carrier signal output from the IFFT operating unit 70, and supplies this hard decision result to the subtractor 106.

The subtractor 106 subtracts the equalized time domain single carrier signal output from the IFFT operating unit 70 and the hard decision result supplied from the hard decision unit 105, and supplies this subtraction result to the MSE calculation unit 107.

The MSE calculation unit 107 calculates the subtraction result supplied from the subtractor 106, that is, a mean square error (MSE) of an equalization error, and supplies the subtraction result to the equalization error determination unit 102.

The MSE calculation unit 108 calculates the subtraction result supplied from the subtractor 79, that is, a mean square error (MSE) of an equalization error, and supplies the subtraction result to the equalization error determination unit 102.

The equalization error determination unit 102 compares the mean square errors of the equalization errors supplied from the MSE calculation unit 107 and the MSE calculation unit 108, and supplies information of an equalization method of a less error to the equalization method control unit 103.

The equalization method control unit 103 controls the selector 64 based on the determination result supplied from the equalization error determination unit 102, and supplies a result of a less equalization error among one of the frequency domain equalization result ODF(t) of the frequency domain equalization unit 61 and the time domain equalization result ODT(t) of the time domain equalization unit 65 to be supplied to the selector 64, to the selector 63 as an equalization result ODS(t) upon single carrier transmission.

Naturally, by using not only mean square errors of equalization errors but also other indices such as an error calculated by the error correction unit 58, a better equalization method of the frequency domain equalization result of the frequency domain equalization unit 61 and the time domain equalization result of the time domain equalization unit 65 may be selected.

[Fifth Configuration Example of Equalization Processing Unit 57]

Figure 16:
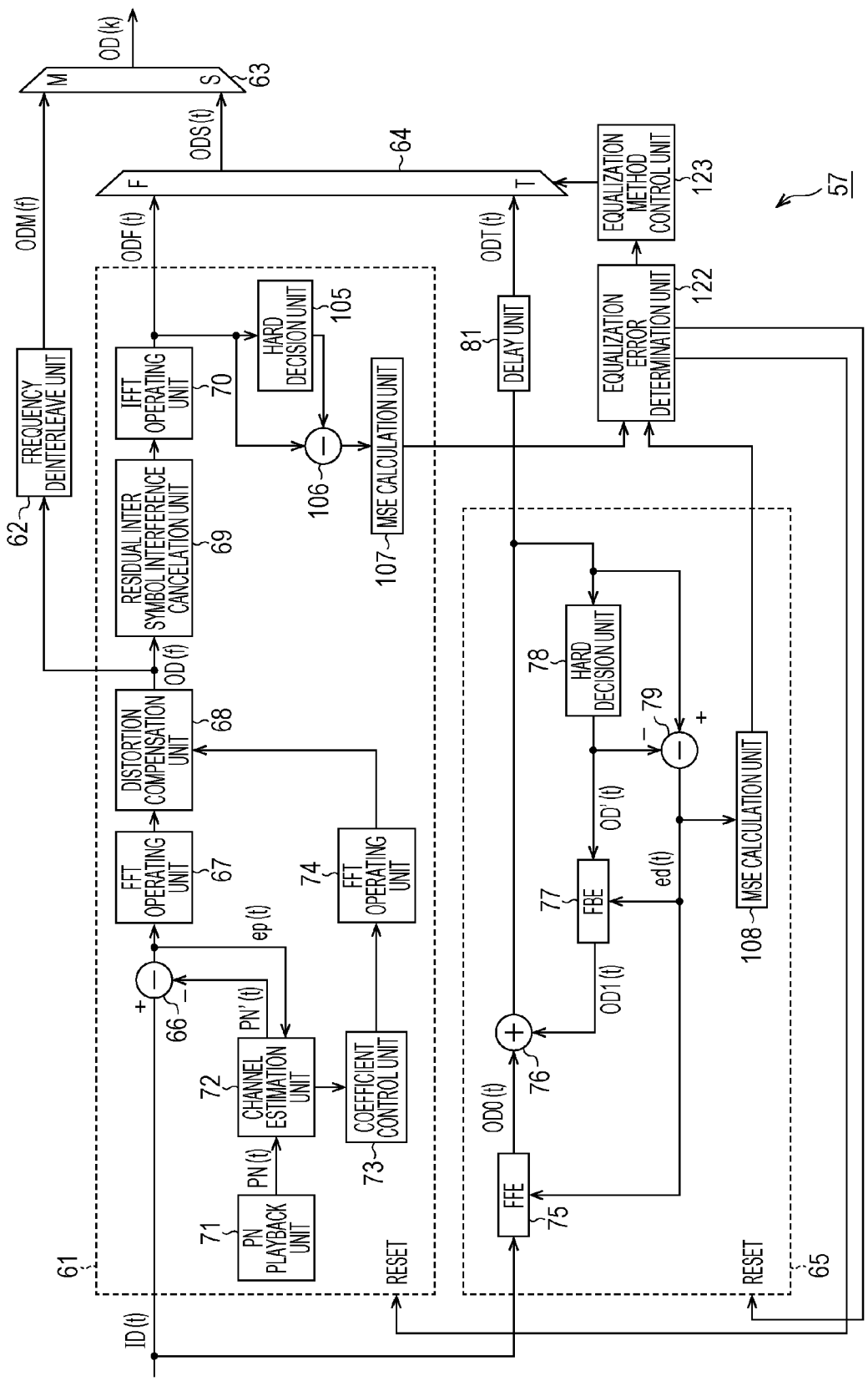
FIG. 16 is a view illustrating a fifth detailed configuration example of the equalization processing unit.

FIG. 16 is a view illustrating a fifth detailed configuration example of the equalization processing unit 57. The same components illustrated in FIG. 16 as those illustrated in FIG. 15 will be assigned the same reference numerals. Overlapping description will be skipped where necessary.

A configuration of the equalization processing unit 57 illustrated in FIG. 16 differs from that in FIG. 15 in supplying reset signals to the frequency domain equalization unit 61 and the time domain equalization unit 65 under control of the equalization error determination unit 122.

When equalization processing is performed upon single carrier transmission, the equalization processing unit 57 supplies a frequency domain equalization result ODF(t) of the frequency domain equalization unit 61 and a time domain equalization result ODT(t) of the time domain equalization unit 65 to the selector 64.

The selector 64 is controlled by the equalization method control unit 123, and supplies one of the equalization results to a subsequent stage. FIG. 16 is a view illustrating one configuration example related to a method of controlling this equalization method.

The equalization error determination unit 122 compares the mean square errors of the equalization errors supplied from the MSE calculation unit 107 and the MSE calculation unit 108 as described above, and supplies information of an equalization method of a less error to the equalization method control unit 123 and supplies a reset signal to an equalization method of a more significant error, that is, one of the frequency domain equalization unit 61 and the time domain equalization unit 65.

The frequency domain equalization unit 61 or the time domain equalization unit 65 which receives a supply of the reset signal executes a do-over of equalization processing.

The equalization method control unit 123 controls the selector 64 based on the determination result supplied from the equalization error determination unit 122, and supplies a result of a less quantization error among one of the frequency domain equalization result ODF(t) of the frequency domain equalization unit 61 and the time domain equalization result ODF(t) of the time domain equalization unit 65 to be supplied to the selector 64, to the selector 63 as an equalization result ODS(t) upon single carrier transmission.

The equalization error determination unit 122 which is reset based on the equalization error is reset and requests a do-over of equalization processing when the equalization error is significant and the equalization coefficient does not normally converge. In this case, a result of a less equalization error, that is, the equalization result of the frequency domain equalization unit 61 or the time domain equalization unit 65 is supplied from the selector 64 as a single carrier equalization result.

According to the above operation, it is possible to output a better equalization result at all times without influencing processing of a subsequent stage, and execute a do-over of equalization processing of a more significant error in parallel.

Further, when an equalizer (the frequency domain equalization unit 61 or the time domain equalization unit 65) does not normally operate, the entire reception system (reception device 51) does not need to be reset, the synchronization unit 56 is not reset and one of the frequency domain equalization unit 61 and the time domain equalization unit 65 in the equalization processing unit 57 is only reset, and an equalization result according to an equalization method which is not reset is continuously output, so that an image which is being received for broadcasting is not broken once due to re-synchronization processing.

[Sixth Configuration Example of Equalization Processing Unit 57]

Figure 17:
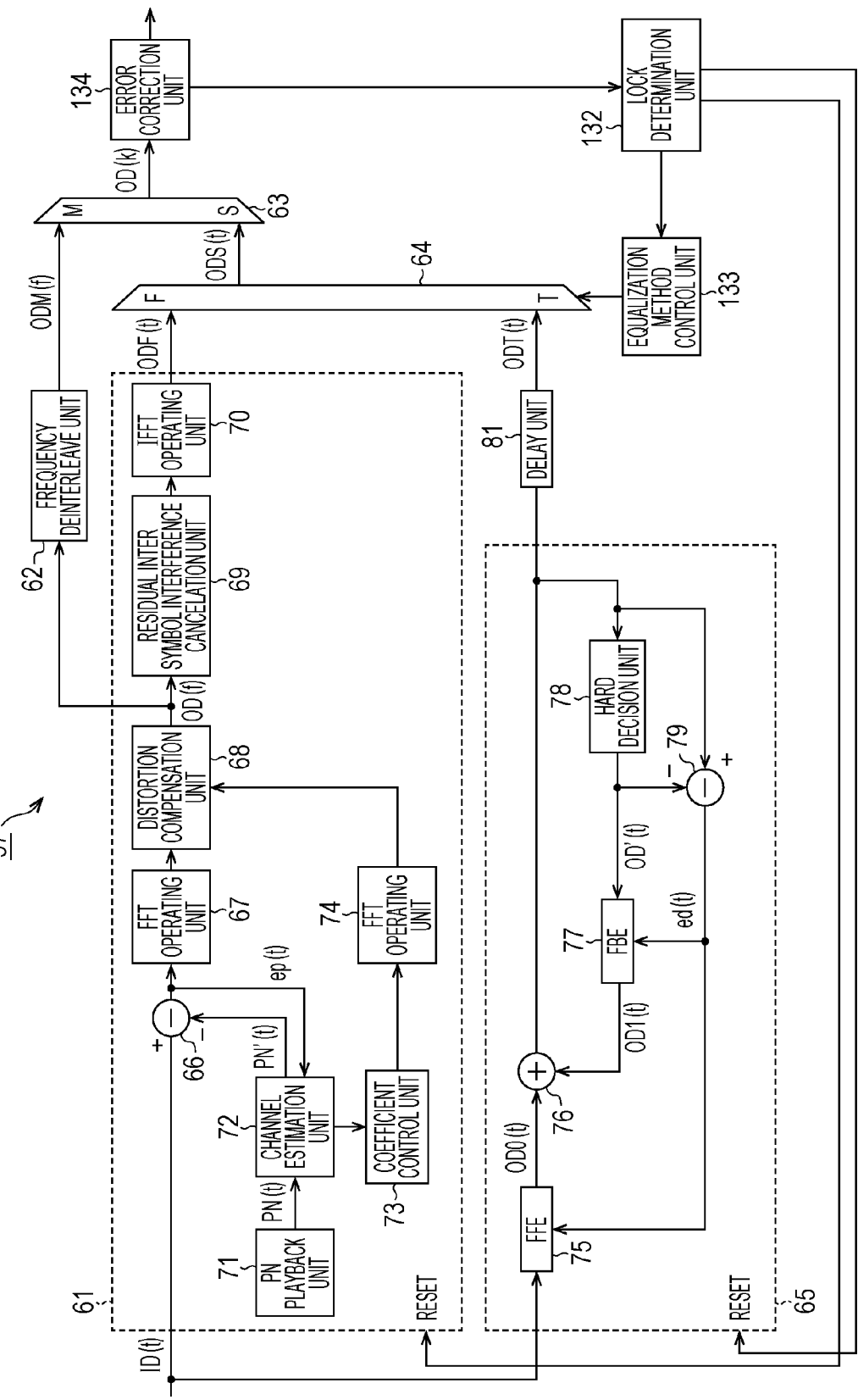
FIG. 17 is a view illustrating a sixth detailed configuration example of the equalization processing unit.

FIG. 17 is a view illustrating a sixth detailed configuration example of the equalization processing unit 57. The same components illustrated in FIG. 17 as those illustrated in FIG. 12 will be assigned the same reference numerals. Overlapping description will be skipped where necessary.

A configuration of the equalization processing unit 57 illustrated in FIG. 17 differs from that in FIG. 12 in adding a lock determination unit 132 and causing an equalization method control unit 133 to operate based on the lock determination unit 132. Further, the error correction unit 134 differs from the error correction unit 58 in FIG. 3 in outputting information required by the lock determination unit 132.

As to an operation of equalization processing upon multicarrier transmission, the added lock determination unit 132 and the equalization method control unit 133 have no influence on the operation upon multicarrier equalization.

When equalization processing is performed upon single carrier transmission, the equalization processing unit 57 supplies a frequency domain equalization result ODF(t) of the frequency domain equalization unit 61 and a time domain equalization result ODT(t) of the time domain equalization unit 65 to the selector 64.

The selector 64 is controlled by the equalization method control unit 133, and supplies one of the equalization results to a subsequent stage. FIG. 17 is a view illustrating one configuration example related to a method of controlling this equalization method.

The error determination unit 134 performs error correction, and supplies this result correction error to the lock determination unit 132.

The lock determination unit 132 determines whether or not demodulation is locked based on error information supplied from the error correction unit 134, and supplies this result to the equalization method control unit 133.

The equalization method control unit 133 controls the selector 64 based on the determination result supplied from the lock determination unit 132, and supplies one of the frequency domain equalization result ODF(t) of the frequency domain equalization unit 61 and the time domain equalization result ODT(t) of the time domain equalization unit 65 to be supplied to the selector 64, to the selector 63 as an equalization result ODS(t) upon single carrier transmission.

Meanwhile, operations of the lock determination unit 132 and the equalization method control unit 133 will be described. Upon demodulation using one of frequency domain equalization and time domain equalization methods selected by the selector 64, the lock determination unit 132 performs lock determination.

When the lock determination unit 132 determines that demodulation is not locked, control is performed such that a currently selected equalization method, that is, one of the frequency domain equalization unit 61 and the time domain equalization unit 65, is reset, and the equalization method control unit 133 selects an equalization method which is not selected.

Figure 18:
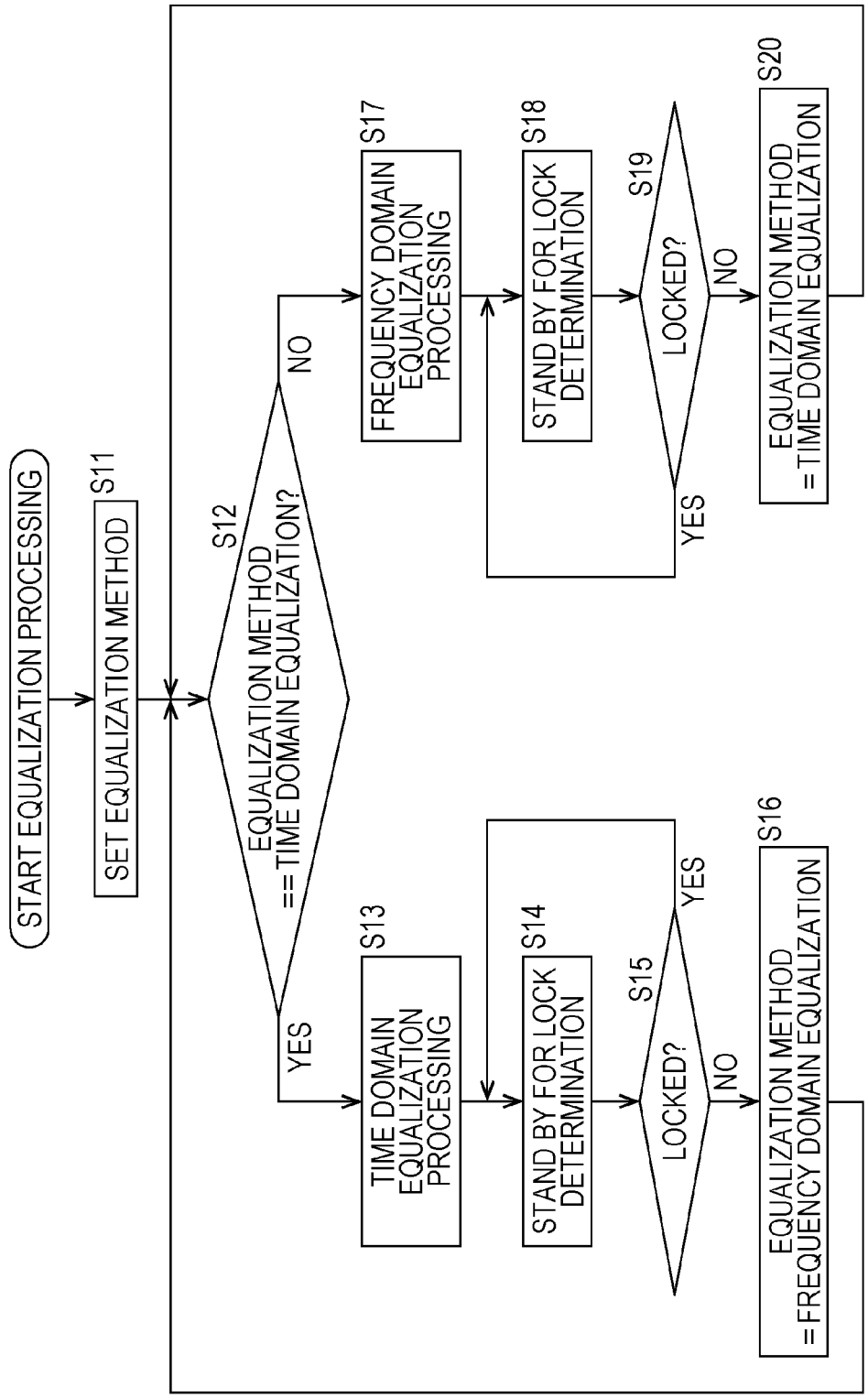
FIG. 18 is a flowchart for explaining an equalization method control unit.

Hereinafter, a flow of equalization processing performed by the equalization processing unit 57 in FIG. 17 will be described with reference to the flowchart in FIG. 18. The equalization processing is started when the input signal ID(t) is input to the equalization processing unit 57.

In step S11, the equalization method control unit 133 selects an equalization method at a time of start, and the selector 64 supplies a result of the selected equalization method to a subsequent stage.

In step S12, when the equalization method control unit 133 determines the current equalization method, and the selector 64 selects time domain equalization performed by the time domain equalization unit 65, the flow proceeds to S13. Alternatively, when the selector selects frequency domain equalization performed by the frequency domain equalization unit 61, the flow proceeds to S17.

In step S13, the time domain equalization unit 65 performs equalization processing, and the equalization result is supplied to the error correction unit 134 through the selector 64 and the selector 63.

In step S14, processing stands by in this state until it is possible to perform lock determination. The operation of a circuit includes calculating an error in the error correction unit 134, and supplies the error to the lock determination unit 132. In step S15, the lock determination unit 132 determines based on the amount of produced error whether or not demodulation is normally performed, that is, whether or not demodulation is locked. Meanwhile, an error refers to an error due to BCH decoding or an error due to conversion in packet units.

In step S15, when demodulation is locked as a result of determination by the lock determination unit 132, the equalization method selected by the selector 64 is continuously selected, processing returns to step S14 and lock determination is repeatedly performed.

By contrast with this, when it is determined that demodulation is not locked as a result of determination by the lock determination unit 132, processing proceeds from step S15 to step S16, the selector 64 switches the equalization method to frequency domain equalization performed by the frequency domain equalization unit 61 and the time domain equalization unit 65 is reset. Further, processing returns to step S12.

In step 12, frequency domain equalization performed by the frequency domain equalization unit 61 is selected, and then processing proceeds to step S17.

In step S17, the frequency domain equalization processing unit 61 performs equalization processing, and the equalization result is supplied to the error correction unit 134 through the selector 64 and the selector 63.

In step S18, processing stands by in this state until it is possible to perform lock determination. The operation of a circuit includes calculating an error in the error correction unit 134, and supplies the error to the lock determination unit 132. In step S19, the lock determination unit 132 determines based on the amount of produced error whether or not demodulation is normally performed, that is, whether or not demodulation is locked. Meanwhile, an error refers to an error due to BCH decoding or an error due to conversion in packet units.

In step S19, when demodulation is locked as a result of determination by the lock determination unit 132, the equalization method selected by the selector 64 is continuously selected, processing returns to step S18 and lock determination is repeatedly performed.

By contrast with this, when it is determined that demodulation is not locked as a result of determination by the lock determination unit 132, processing proceeds from step S19 to step S20, the selector 64 switches the equalization method to time domain equalization performed by the time domain equalization unit 61 and the frequency domain equalization unit 61 is reset. Further, processing returns to step S12.

As described above, by monitoring a lock state at all times, performing resetting when equalization processing is unlocked, switching one equalization method to the other equalization method and performing equalization processing, it is possible to output a better equalization result at all times without influencing subsequent processing, and execute a do-over of equalization processing which is unlocked in parallel.

Further, when an equalizer does not normally operate, the entire reception system does not need to be reset, the synchronization unit 56 is not reset and one of the frequency domain equalization unit 61 and the time domain equalization unit 65 in the equalization processing unit 57 is only reset, and an equalization result according to an equalization method which is not reset is continuously output, so that an image which is being received for broadcasting is not broken once due to re-synchronization processing.

[Configuration Example of Adaptive Filter]

Figure 19:
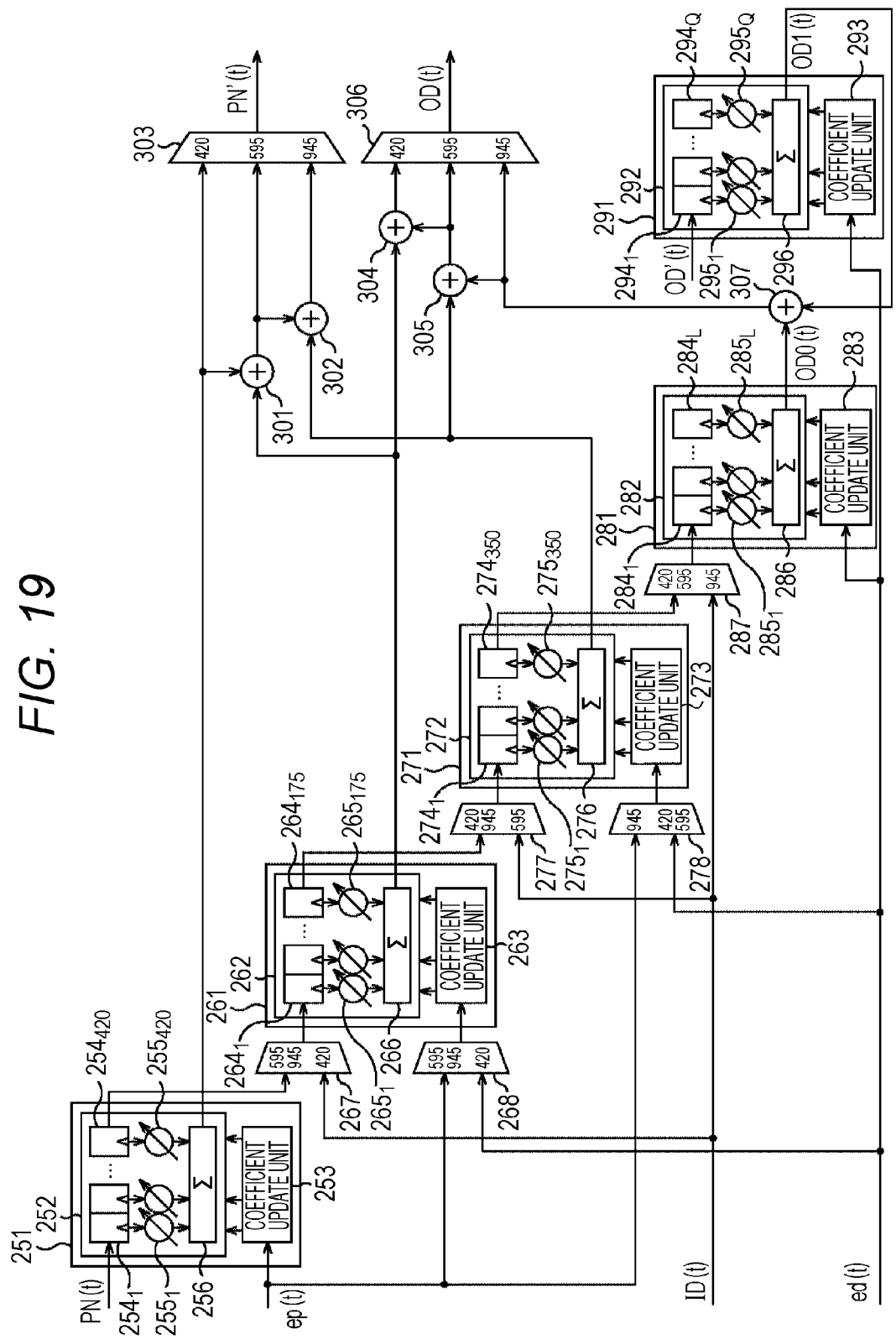
FIG. 19 is a view illustrating a configuration example of a FFE, a FBE and a channel estimation unit.

FIG. 19 is a view illustrating a configuration example of a FFE, a FBE and a channel estimation unit.

As described above, the channel estimation unit 72 of the frequency domain equalization unit 61, and the FFE 75 and the FBE 77 of the time domain equalization unit 65 in FIG. 8 have adaptive filters. FIG. 19 is a view illustrating one configuration example in case that three adaptive filters are mounted by sharing resources.

According to the DTMB standard, as illustrated in FIG. 6, three types of PNs, that is, the PN 420, the PN 595 and the PN 945 are defined and have symbol lengths of 420 symbols, 595 symbols and 945 symbols, respectively.

First, a configuration and a basic operation of each circuit will be described, and then an operation of each PN will be described.

A channel estimation unit 251 has a variable coefficient filter 252 and a coefficient update unit 253.

The variable coefficient filter 252 is a filter of 420 taps, and has 420 latch circuits $254_1$, $254_2$, ..., and $254_{420}$, 420 multipliers $255_1$, $255_2$, ..., and $255_{420}$ and an adder 256.

An operation of the channel estimation unit 251 is the same as that of the channel estimation unit 72 illustrated in FIG. 9, and the variable coefficient filter 252 performs a product-sum operation, that is, convolution on a PN sequence supplied from the PN playback unit 71 in FIG. 8 and a tap coefficient supplied from the coefficient update unit 253, that is, an impulse response of channel characteristics, and supplies a result obtained by filtering the PN sequence by the channel characteristics as an estimated PN sequence to a selector 303 and an adder 301.

The coefficient update unit 253 updates a coefficient based on the result ep(t) of the subtractor 66 in FIG. 8.

The adaptive filter 261 has the variable coefficient filter 262 and the coefficient update unit 263.

The variable coefficient filter 262 is a filter of 175 taps, and has 175 latch circuits $264_1$, $264_2$, ..., and $264_{175}$, 175 multipliers $265_1$, $265_2$, ..., and $265_{175}$, and an adder 266.

An operation of the adaptive filter 261 is the same as that of the FFE 75 illustrated in FIG. 10, and the variable coefficient filter 262 performs a product-sum operation on a signal input through the selector 267 and output from the latch circuit $254_{420}$ of the channel estimation unit 251 or ID(t) supplied to the equalization processing unit 57 in FIG. 8, and the tap coefficient supplied from the coefficient update unit 263, and supplies this product-sum operation result as a filtering result of the input data to the adder 301 and the adder 304.

The adder 301 supplies a result obtained by adding the product-sum operation result of the channel estimation unit 251 and the product-sum operation result of the adaptive filter 261, to the selector 303.

The adder 304 supplies a result obtained by adding the product-sum operation result of the adaptive filter 261 and the result of the adder 305, to the selector 306.

The coefficient update unit 263 updates a coefficient based on the result ep(t) of the subtractor 66 in FIG. 8 or the result ed(t) of the subtractor 79 input through the selector 268.

The adaptive filter 271 has the variable coefficient filter 272 and the coefficient update unit 273.

The variable coefficient filter 272 is a filter of 350 taps, and has 350 latch circuits $274_1$, $274_2$, ..., and $274_{350}$, 350 multipliers $275_1$, $275_2$, ..., and $275_{350}$ and an adder 276.

An operation of the adaptive filter 271 is the same as that of the FFE 75 illustrated in FIG. 10, and the variable coefficient filter 272 performs a product-sum operation on a signal input through the selector 277 and output from the latch circuit $264_{175}$ of the adaptive filter 261 or ID(t) supplied to the equalization processing unit 57 in FIG. 8, and the tap coefficient supplied from the coefficient update unit 273, and supplies this product-sum operation result as a filtering result of input data to the adder 302 and the adder 305.

The adder 302 supplies a result obtained by adding the result of the adder 301 and the product-sum operation result of the adaptive filter 271, to the selector 303.

The adder 305 supplies a result obtained by adding the result of the adaptive filter 271 and the result of the adder 307, to the selector 306.

The coefficient update unit 273 updates a coefficient based on the result ep(t) of the subtractor 66 in FIG. 8 or the result ed(t) of the subtractor 79 input through the selector 278.

The FFE 281 has the variable coefficient filter 282 and the coefficient update unit 283.

The variable coefficient filter 282 is a filter of L taps, and L latch circuits $284_1$, $284_2$, ..., and $284_L$, L multipliers $285_1$, $285_2$, ..., and $285_L$ and an adder 286.

An operation of the FFE 281 is the same as that of the FFE 75 illustrated in FIG. 10, and the variable coefficient filter 282 performs a product-sum operation on a signal input through the selector 287 and output from the latch circuit $274_{350}$ of the adaptive filter 271 or ID(t) supplied to the equalization processing unit 57 in FIG. 8, and the tap coefficient supplied from the coefficient update unit 283, and supplies this product-sum operation result as a filtering result OD0(t) of the input data to the adder 307.

The coefficient update unit 283 updates a coefficient based on the result ed(t) of the subtractor 79 in FIG. 8.

The FBE 291 has the variable coefficient filter 292 and the coefficient update unit 293.

The variable coefficient filter 292 is a filter of Q taps, and has Q latch circuits $294_1$, $294_2$, ..., and $294_Q$, Q multipliers $295_1$, $295_2$, ..., and $295_Q$ and an adder 296.

An operation of FBE 291 is the same as that of the FBE 77 illustrated in FIG. 11, and the variable coefficient filter 292 performs a product-sum operation on the hard decision result OD' (t) input from the hard decision unit 78 in FIG. 8 and the tap coefficient supplied from the coefficient update unit 293, and supplies this product-sum operation result as a filtering result OD1(t) of the input data to the adder 307.

The coefficient update unit 293 updates a coefficient based on the result ed(t) of the subtractor 79 in FIG. 8.

The adder 307 adds the product-sum operation result of the FFE 281 and the product-sum operation result of the FBE 291, and supplies the addition result to the adder 305 and the selector 306.

As described above, operations of an adaptive filter and each selector which are configured and operate as described above will be described per PN.

The numbers described in selectors in the figure represent each PN. That is, a signal connected to "420" is selected upon the PN 420, a signal connected to "595" is selected upon the PN 595 and a signal connected to "945" is selected upon the PN 945.

First, an operation of receiving the PN 420 and performing equalization processing in the equalization processing unit 57 will be described.

The selector 303 selects a filtering result of the channel estimation unit 251, and supplies the filtering result to the subtractor 66 in FIG. 8.

The adaptive filter 261 performs a product-sum operation on the input data ID(t) to the equalization processing unit 57 in FIG. 8 through the selector 267, and updates a coefficient based on the result ed(t) of the subtractor 79 in FIG. 8.

The adaptive filter 271 performs a product-sum operation on an output of the latch circuit $264_{175}$ of the adaptive filter 261 input through the selector 277, and updates the coefficient based on the result ed(t) of the subtractor 79 in FIG. 8.

The FFE 281 performs a product-sum operation on an output of the latch circuit $274_{350}$ of the adaptive filter 271 input through the selector 287, and updates the coefficient based on the result ed(t) of the subtractor 79 in FIG. 8.

The selector 306 supplies a result obtained by adding filtering results of the adaptive filter 261, the adaptive filter 271, the FFE 281 and the FBE 291, to the selector 64 as an equalization result ODT(T) of the time domain equalization unit 65 in FIG. 8.

That is, upon reception of the PN 420, only the channel estimation unit 252 is used as the channel estimation unit 72 of the frequency domain equalization unit 61 in FIG. 8, and the adaptive filter 261, the adaptive filter 271 and the FFE 281 are connected and used as the FFE 75 of the time domain equalization unit 65.

Next, an operation of receiving the PN 595 and performing equalization processing in the equalization processing unit 57 will be described.

The adaptive filter 261 performs a product-sum operation on an output of the latch circuit $254_{420}$ of the channel estimation unit 251 input through the selector 267, and updates the coefficient based on the result ep(t) of the subtractor 66 in FIG. 8.

The selector 303 supplies a result obtained by adding filtering results of the channel estimation unit 251 and the adaptive filter 261 to the subtractor 66 in FIG. 8.

The adaptive filter 271 performs a product-sum operation on the input data ID(t) of the equalization processing unit 57 in FIG. 8 input through the selector 277, and updates a coefficient based on the result ed(t) of the subtractor 79 in FIG. 8.

The FFE 281 performs a product-sum operation on an output of the latch circuit $274_{350}$ of the adaptive filter 271 input through the selector 287, and updates the coefficient based on the result ed(t) of the subtractor 79 in FIG. 8.

The selector 306 supplies a result obtained by adding filtering results of the adaptive filter 271, the FFE 281 and the FBE 291, to the selector 64 as an equalization result ODT(T) of the time domain equalization unit 65 in FIG. 8.

That is, upon reception of the PN 595, the channel estimation unit 251 and the adaptive filter 261 are connected and used as the channel estimation unit 72 of the frequency domain equalization unit 61 in FIG. 8, and the adaptive filter 271 and the FFE 281 are connected and used as the FFE 75 of the time domain equalization unit 65.

Next, an operation of receiving the PN 4945 and performing equalization processing in the equalization processing unit 57 will be described.

The adaptive filter 261 performs a product-sum operation on an output of the latch circuit $254_{420}$ of the channel estimation unit 251 input through the selector 267, and updates the coefficient based on the result ep(t) of the subtractor 66 in FIG. 8.

The adaptive filter 271 performs a product-sum operation on an output of the latch circuit $264_{175}$ of the adaptive filter 261 input through the selector 277, and updates the coefficient based on the result ep(t) of the subtractor 66 in FIG. 8.

The selector 303 supplies a result obtained by adding filtering results of the channel estimation unit 251, the adaptive filter 261 and the adaptive filter 271 to the subtractor 66 in FIG. 8.

The FFE 281 performs a product-sum operation on the input data ID(t) to the equalization processing unit 57 in FIG. 8 input through the selector 287, and updates a coefficient based on the result ed(t) of the subtractor 79 in FIG. 8.

The selector 306 supplies a result obtained by adding filtering results of the FFE 281 and the FBE 291, to the selector 64 as an equalization result ODT(T) of the time domain equalization unit 65 in FIG. 8.

That is, upon reception of the PN 945, the channel estimation unit 251, the adaptive filter 261 and the adaptive filter 271 are connected and used as the channel estimation unit 72 of the frequency domain equalization unit 61 in FIG. 8, and only the FFE 281 is used as the FFE 75 of the time domain equalization unit 65.

As described above, by dividing and implementing the three adaptive filters of the channel estimation unit 72, the FFE 75 and the FBE 77 in FIG. 8 and sharing and using resources, it is possible to suppress a circuit scale.

Further, an input of the channel estimation unit 251 is a PN sequence, so that, by employing a configuration of narrowing bit widths of the latch circuits $254_1$ to $254_{420}$, it is possible to suppress circuit scales of a product-sum operation portion of the channel estimation unit 251 (multipliers $255_1$ to $255_{420}$ and the adder 256) and a coefficient update portion (coefficient update unit 253).

Although the above description has been provided focusing on a time upon reception of a single carrier signal, it is possible to perform equalization processing upon multicarrier reception according to the same configuration by performing frequency domain equalization using the output PN'(t) of the selector 303.

[Explanation of Computer to which Present Technique is Applied]

Next, the above series of processing can be executed by hardware or can be executed by software. When the series of processing is executed by software, a program which configures this software is installed in, for example, a general-purpose computer.

Figure 20:
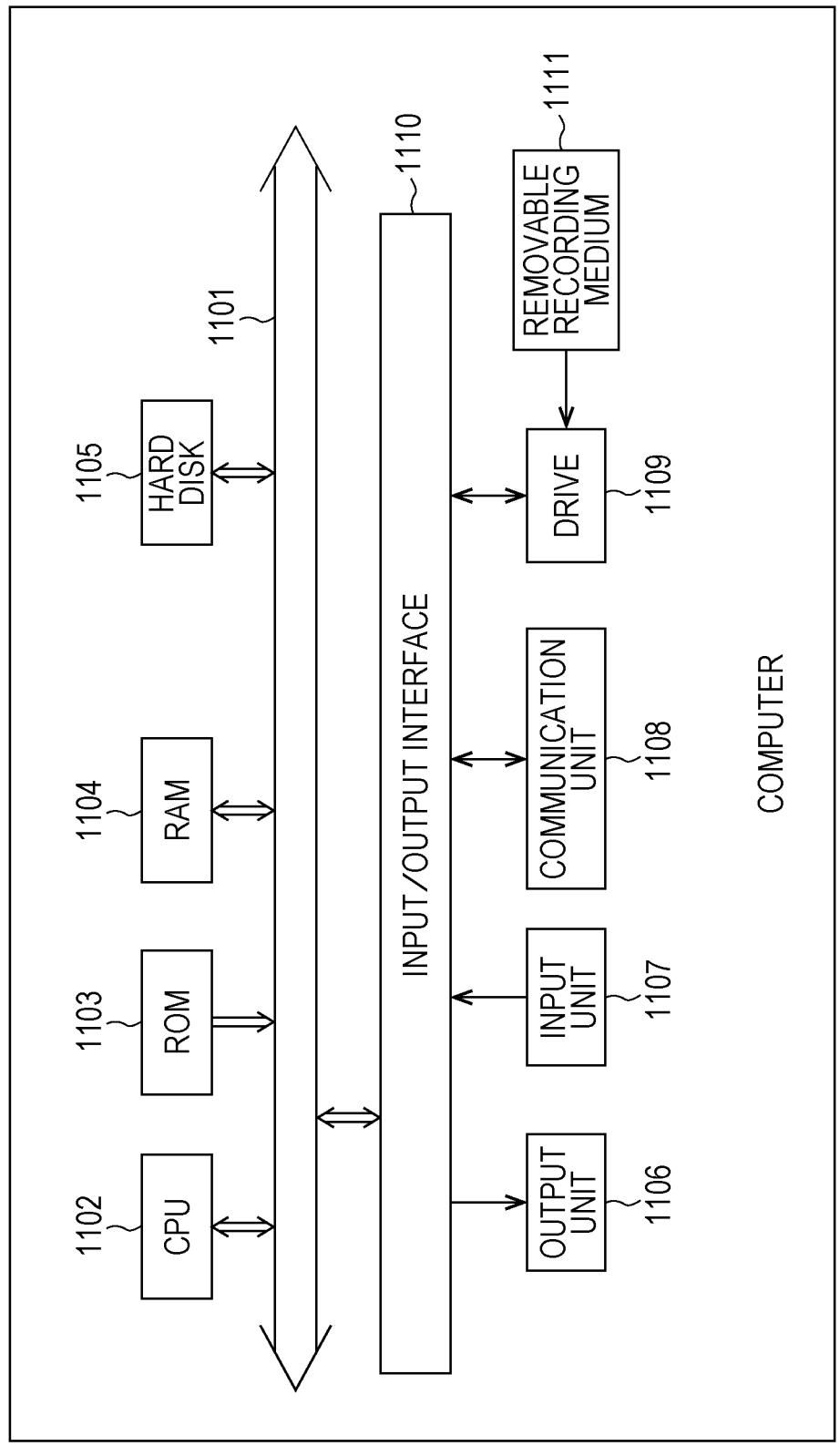
FIG. 20 is a block diagram illustrating a configuration example according to one embodiment of a computer to which the present technique is applied.

FIG. 20 illustrates a configuration example of one embodiment of a computer in which the program which executes the above series of processing is installed.

The program can be recorded in advance in a hard disk 1105 or a ROM 1103 which is a recording medium built in the computer.

Alternatively, the program can be stored (recorded) in a removable recording medium 1111. This removable recording medium 1111 can be provided as so-called package software. Meanwhile, the removable recording medium 1111 is, for example, a flexible disk, a CD-ROM (Compact Disc Read Only Memory), a MO (Magneto Optical) disk, a DVD (Digital Versatile Disc), a magnetic disk or a semiconductor memory.

In addition, the program can be installed in the computer from the above removable recording medium 1111 and, in addition, can be downloaded to the computer through a communication network or a broadcasting network and installed in the built-in hard disk 1105. That is, the program can be transferred by radio from, for example, a download site to the computer through a digital satellite broadcasting artificial satellite, or can be transferred to the computer by way of wired transfer through a network such as a LAN (Local Area Network) and the Internet.

The computer has a built-in CPU (Central Processing Unit) 1102, and the CPU 1102 is connected with an input/output interface 1110 through a bus 1101.

When the user operates the input unit 1107 through the input/output interface 1110 and the CPU 1102 receives an input of a command, the CPU executes the program stored in the ROM (Read Only Memory) 1103 according to this command. Alternatively, the CPU 1102 loads the program stored in the hard disk 1105 to the RAM (Random Access Memory) 1104 to execute.

By this means, the CPU 1102 performs processing according to the above flowchart or processing performed by the configurations in the above block diagrams. Further, the CPU 1102 causes the output unit 1106 to output this processing result through, for example, the input/output interface 1110, causes the communication unit 1108 to transmit the processing result or causes the hard disk 1105 to record the processing result where necessary.

In addition, the input unit 1107 includes, for example, a keyboard, a mouse and a microphone. Further, the output unit 1106 has a LCD (Liquid Crystal Display) or speakers.

Meanwhile, processing executed by the computer according to the program in this description does not need to be performed at all times in time sequences according to the order described as the flowcharts. That is, processing executed by the computer according to the program include processing (for example, parallel processing or processing based on an object) executed in parallel or individually.

Further, the program may be processed by one computer (processor) or may be distributed and processed by a plurality of computers. Furthermore, the program may be transferred to a distant computer and executed.

In addition, the embodiment according to the present technique is by no means limited to the above embodiment, and can be variously changed within a range which does not deviate from the spirit of the present technique.

REFERENCE SIGNS LIST

11 Subtractor, 12 FFT operating unit, 13 Distortion compensation unit, 14 PN playback unit, 15 Channel estimation unit, 16 Control unit, 17 FFT operating unit, 21 FFE, 22 Adder, 23 FBE, 24 Hard decision unit, 25 Subtractor, 51 Reception device, 52 Antenna, 53 Tuner, 54 A/D conversion unit, 55 Orthogonal demodulation unit, 56 Synchronization unit, 57 Equalization processing unit, 58 Error correction unit, 61 Frequency domain equalization unit, 62 Frequency deinterleave unit, 63, 64 Selector, 65 Time domain equalization unit, 66 Subtractor, 67 FFT operating unit, 68 Distortion compensation unit, 69 Residual inter symbol interference cancellation unit, 70 IFFT operating unit, 71 PN playback unit, 72 Channel estimation unit, 73 Coefficient control unit, 74 FFT operating unit, 75 FFE, 76 Adder, 77 FBE, 78 Hard decision unit, 79 Subtractor, 80 Equalization method control unit, 81 Delay unit, 92 Channel state determination unit, 93 Equalization method control unit, 102 Equalization error determination unit, 103 Equalization method control unit, 105 Hard decision unit, 106 Subtractor, 107, 108 MSE calculation unit, 122 Equalization error determination unit, 123 Equalization method control unit, 132 Lock determination unit, 133 Equalization method control unit, $211_1$ to $211_N$ Latch circuit, $212_1$ to $212_N$ Multiplier, 213 Adder, 214 Variable coefficient filter, 215 Coefficient update unit, $221_1$ to $221_M$ Latch circuit, $222_1$ to $222_M$ Multiplier, 223 Adder, 224 Variable coefficient filter, 225 Coefficient update unit, $231_1$ to $231_K$ Latch circuit, $232_1$ to $232_K$ Multiplier, 233 Adder, 234 Variable coefficient filter, 235 Coefficient update unit, 251 Channel estimation unit, 252 Variable coefficient filter, 253 Coefficient update unit, $254_1$ to $254_{420}$ Latch circuit, $255_1$ to $255_{420}$ Multiplier, 256 Adder, 261 Adaptive filter, 262 Variable coefficient filter, 263 Coefficient update unit, $264_1$ to $264_{175}$ Latch circuit, $265_1$ to $265_{175}$ Multiplier, 266 Adder, 267, 268 Selector, 271 Adaptive filter, 272 Variable coefficient filter, 273 Coefficient update unit, $274_1$ to $274_{350}$ Latch circuit, $275_1$ to $275_{350}$ Multiplier, 276 Adder, 277, 278 Selector, 281 FFE, 282 Variable coefficient filter, 283 Coefficient update unit, $284_1$ to $284_k$ Latch circuit, $285_1$ to $285_L$ Multiplier, 286 Adder, 287 Selector, 291 FBE, 292 Variable coefficient filter, 293 Coefficient update unit, $294_1$ to $294_Q$ Latch circuit, $295_1$ to $295_Q$ Multiplier, 296 Adder, 301, 302 Adder, 303 Selector, 304, 305 Adder, 306 Selector, 307 Adder, 1101 Bus, 1102 CPU, 1103 ROM, 1104 RAM, 1105 Hard disk, 1106 Output unit, 1107 Input unit, 1108 Communication unit, 1109 Drive, 1110 Input/output interface, 1111 Removable recording medium

The invention claimed is:

1. A reception device comprising:
   a time domain equalization unit configured to receive a signal and to equalize the received signal in a time domain to provide a first equalized signal;
   a frequency domain equalization unit configured to receive the signal in parallel with the time domain equalization unit and to equalize the received signal in a frequency domain to provide a second equalized signal;
   a selector configured to receive the first equalized signal and the second equalized signal directly from the time domain equalization unit and the frequency domain equalization unit and to output only one of the first equalized signal or the second equalized signal; and
   an equalization method control unit connected to the selector and configured to control switching between the output of first and second equalized signals by the selector.

2. The reception device according to claim 1, wherein the received signal is a signal defined according to a GB20600-2006 standard, and, when a C3780 signal defined according to the GB20600-2006 standard is received, the frequency equalization unit equalizes the received signal and, when a C1 signal defined according to the GB20600-2006 standard is received, the equalization method control unit switches between the time domain equalization unit and the frequency domain equalization unit to equalize the received signal.

3. The reception device according to claim 1, wherein the frequency domain equalization unit comprises:
   a FFT operating unit which converts the received signal into a frequency domain signal; and
   a distortion compensation unit which compensates for distortion of the frequency domain signal output from the FFT operating unit using an equalization coefficient.

4. The reception device according to claim 1, wherein the frequency domain equalization unit comprises a channel estimation unit which performs channel estimation based on the received signal, and equalizes the received signal based on a result of the channel estimation performed by the channel estimation unit.

5. The reception device according to claim 4, wherein the time domain equalization unit and the frequency domain unit comprise a shared adaptive filter.

6. The reception device according to claim 1, wherein the frequency domain equalization unit comprises a residual inter symbol interference cancelation unit which cancels a residual inter symbol interference.

7. The reception device according to claim 1, wherein the time domain equalization unit comprises a delay unit which delays an output timing of an equalized time domain signal.

8. The reception device according to claim 1, wherein the equalization method control unit performs switching control according to a channel state.

9. The reception device according to claim 1, wherein the equalization method control unit performs switching control according to an equalization error between the frequency domain equalization and the time domain equalization.

10. The reception device according to claim 1, wherein the equalization method control unit performs switching control according to a lock state.

11. The reception device according to claim 8, wherein the time domain equalization unit and the frequency domain equalization unit each comprise a reset function.

12. A reception method comprising:
   equalizing a received signal in a time domain by a time domain equalization unit to provide a first equalized signal;
   equalizing the received signal in a frequency domain by a frequency domain equalization unit to provide a second equalized signal; and
   receiving the first equalized signal and the second equalized signal directly from the time domain equalization unit and the frequency domain equalization unit and outputting only one of the first equalized signal or the second equalized signal, wherein
   the frequency domain equalization unit is provided in parallel to the time domain equalization unit.

* * * * *